(12) United States Patent
Nguyen

(10) Patent No.: US 9,483,901 B2
(45) Date of Patent: Nov. 1, 2016

(54) GAMING DEVICE DOCKING STATION

(71) Applicant: Binh T. Nguyen, Reno, NV (US)

(72) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 276 days.

(21) Appl. No.: 13/833,953

(22) Filed: Mar. 15, 2013

(65) Prior Publication Data

US 2014/0274309 A1  Sep. 18, 2014

(51) Int. Cl.
*G07F 17/32* (2006.01)

(52) U.S. Cl.
CPC ....... *G07F 17/3202* (2013.01); *G07F 17/3218* (2013.01); *G07F 17/3225* (2013.01)

(58) Field of Classification Search
USPC ........................................ 463/20, 25, 26, 30
See application file for complete search history.

(56) References Cited

U.S. PATENT DOCUMENTS

| | | |
|---|---|---|
| 2,033,638 A | 3/1936 | Koppl |
| 2,062,923 A | 12/1936 | Nagy |
| 4,741,539 A | 5/1988 | Sutton et al. |
| 4,948,138 A | 8/1990 | Pease et al. |
| 5,067,712 A | 11/1991 | Georgilas |
| 5,429,361 A | 7/1995 | Raven et al. |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |
| 6,089,977 A | 7/2000 | Bennett |
| 6,095,920 A | 8/2000 | Sadahiro |
| 6,110,041 A | 8/2000 | Walker et al. |
| 6,142,872 A | 11/2000 | Walker et al. |
| 6,146,273 A | 11/2000 | Olsen |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Finnegan, Amanda, "Casinos Connecting with Customers via Iphone Apps", May 27, 2010, Las Vegas Sun, Las Vegas, NV.

(Continued)

*Primary Examiner* — Paul A D'Agostino
*Assistant Examiner* — Brandon Gray

(57) ABSTRACT

In one embodiment, a system to authorize a mobile electronic device to play games of chance includes a gaming system manager and a portable docking station configured to: (i) detect whether the mobile electronic device is connected to a receiver of the portable docking station; (ii) receive device information from the mobile electronic device if it is detected that the mobile electronic device is connected to the receiver; (iii) determine whether the games of chance can be played on the mobile electronic device based on the received device information; (iv) authorize the mobile electronic device to play the games of chance; and (v) transmit gaming data to the mobile electronic device if it is determined that the games of chance can be played on the mobile electronic device and if the mobile electronic device is authorized.

20 Claims, 19 Drawing Sheets

(56) References Cited

U.S. PATENT DOCUMENTS

| | | |
|---|---|---|
| 6,165,071 A | 12/2000 | Weiss |
| 6,231,445 B1 | 5/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,353,390 B1 | 3/2002 | Beri et al. |
| 6,364,768 B1 | 4/2002 | Acres et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,505,095 B1 | 1/2003 | Kolls |
| 6,561,900 B1 | 5/2003 | Baerlocher et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,719,630 B1 | 4/2004 | Seelig et al. |
| 6,749,510 B2 | 6/2004 | Giobbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers et al. |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Baerlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| RE39,644 E | 5/2007 | Alcorn et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,448,949 B2 | 11/2008 | Kaminkow et al. |
| 7,500,913 B2 | 3/2009 | Baerlocher |
| 7,510,474 B2 | 3/2009 | Carter, Sr. |
| 7,513,828 B2 | 4/2009 | Nguyen et al. |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,699,703 B2 | 4/2010 | Muir et al. |
| 7,722,453 B2 | 5/2010 | Lark et al. |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,822,688 B2 | 10/2010 | Labrou |
| 7,828,652 B2 | 11/2010 | Nguyen et al. |
| 7,828,654 B2 | 11/2010 | Carter |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen et al. |
| 8,087,988 B2 | 1/2012 | Nguyen et al. |
| 8,117,608 B1 | 2/2012 | Slettehaugh et al. |
| 8,182,326 B2 | 5/2012 | Speers et al. |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,858,323 B2 | 10/2014 | Nguyen et al. |
| 2002/0042295 A1 | 4/2002 | Walker et al. |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0142825 A1 | 10/2002 | Lark et al. |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0167536 A1 | 11/2002 | Valdes et al. |
| 2002/0183105 A1 | 12/2002 | Cannon et al. |
| 2003/0001338 A1 | 1/2003 | Bennett et al. |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |

(56) References Cited

U.S. PATENT DOCUMENTS

| | | |
|---|---|---|
| 2003/0100361 A1 | 5/2003 | Sharpless et al. |
| 2003/0104860 A1 | 6/2003 | Cannon et al. |
| 2003/0104865 A1 | 6/2003 | Itkis et al. |
| 2003/0162588 A1 | 8/2003 | Brosnan et al. |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0048650 A1 | 3/2004 | Mierau et al. |
| 2004/0082385 A1 | 4/2004 | Silva et al. |
| 2004/0106449 A1 | 6/2004 | Walker et al. |
| 2004/0127290 A1 | 7/2004 | Walker et al. |
| 2004/0137987 A1 | 7/2004 | Nguyen et al. |
| 2004/0147308 A1 | 7/2004 | Walker et al. |
| 2004/0224753 A1 | 11/2004 | O'Donovan et al. |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0181870 A1 | 8/2005 | Nguyen et al. |
| 2005/0187020 A1 | 8/2005 | Amaitis et al. |
| 2005/0202875 A1 | 9/2005 | Murphy et al. |
| 2005/0209002 A1 | 9/2005 | Blythe et al. |
| 2005/0277471 A1 | 12/2005 | Russell et al. |
| 2006/0009283 A1 | 1/2006 | Englman et al. |
| 2006/0035707 A1* | 2/2006 | Nguyen et al. ............... 463/29 |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0281525 A1 | 12/2006 | Borissov |
| 2006/0281541 A1 | 12/2006 | Nguyen et al. |
| 2007/0004510 A1 | 1/2007 | Underdahl et al. |
| 2007/0060254 A1 | 3/2007 | Muir |
| 2007/0060358 A1 | 3/2007 | Amaitis et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0129123 A1 | 6/2007 | Eryou et al. |
| 2007/0149279 A1 | 6/2007 | Norden et al. |
| 2007/0149286 A1 | 6/2007 | Bemmel |
| 2007/0159301 A1 | 7/2007 | Brown et al. |
| 2007/0161402 A1 | 7/2007 | Ng et al. |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259717 A1 | 11/2007 | Mattice et al. |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0070506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102956 A1 | 5/2008 | Burman et al. |
| 2008/0102957 A1 | 5/2008 | Burnman et al. |
| 2008/0113772 A1 | 5/2008 | Burrill et al. |
| 2008/0119267 A1 | 5/2008 | Denlay |
| 2008/0146321 A1 | 6/2008 | Parente |
| 2008/0150902 A1 | 6/2008 | Edpalm et al. |
| 2008/0153583 A1 | 6/2008 | Huntley et al. |
| 2008/0167106 A1 | 7/2008 | Lutnick et al. |
| 2008/0182667 A1 | 7/2008 | Davis et al. |
| 2008/0207307 A1 | 8/2008 | Cunningham, II et al. |
| 2008/0214258 A1 | 9/2008 | Brosnan et al. |
| 2008/0234047 A1 | 9/2008 | Nguyen |
| 2008/0238610 A1 | 10/2008 | Rosenberg |
| 2008/0254878 A1 | 10/2008 | Saunders et al. |
| 2008/0254881 A1 | 10/2008 | Lutnick et al. |
| 2008/0254883 A1 | 10/2008 | Patel et al. |
| 2008/0254891 A1 | 10/2008 | Saunders et al. |
| 2008/0254892 A1 | 10/2008 | Saunders et al. |
| 2008/0254897 A1 | 10/2008 | Saunders et al. |
| 2008/0263173 A1 | 10/2008 | Weber et al. |
| 2008/0300058 A1 | 12/2008 | Sum et al. |
| 2008/0305864 A1 | 12/2008 | Kellye et al. |
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0029766 A1 | 1/2009 | Lutnick et al. |
| 2009/0054149 A1 | 2/2009 | Brosnan et al. |
| 2009/0088258 A1 | 4/2009 | Saunders et al. |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0131151 A1 | 5/2009 | Harris et al. |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0149245 A1 | 6/2009 | Fabbri |
| 2009/0149261 A1 | 6/2009 | Chen et al. |
| 2009/0156303 A1 | 6/2009 | Kiely et al. |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0298468 A1 | 12/2009 | Hsu |
| 2010/0002897 A1 | 1/2010 | Keady |
| 2010/0004058 A1 | 1/2010 | Acres |
| 2010/0056248 A1 | 3/2010 | Acres |
| 2010/0062833 A1 | 3/2010 | Mattice et al. |
| 2010/0069160 A1* | 3/2010 | Barrett et al. ............... 463/46 |
| 2010/0081501 A1 | 4/2010 | Carpenter et al. |
| 2010/0099499 A1 | 4/2010 | Amaitis et al. |
| 2010/0124967 A1 | 5/2010 | Lutnick et al. |
| 2010/0160043 A1 | 6/2010 | Fujimoto et al. |
| 2010/0178977 A1 | 7/2010 | Kim et al. |
| 2010/0197383 A1 | 8/2010 | Rad et al. |
| 2010/0203955 A1 | 8/2010 | Sylla |
| 2010/0227662 A1 | 9/2010 | Speers et al. |
| 2010/0227670 A1 | 9/2010 | Arezina et al. |
| 2010/0227687 A1 | 9/2010 | Speers et al. |

(56) References Cited

U.S. PATENT DOCUMENTS

| | | |
|---|---|---|
| 2010/0234091 A1 | 9/2010 | Baerlocher et al. |
| 2010/0279764 A1 | 11/2010 | Allen et al. |
| 2010/0323780 A1 | 12/2010 | Acres |
| 2011/0009181 A1 | 1/2011 | Speers et al. |
| 2011/0039615 A1 | 2/2011 | Acres |
| 2011/0065492 A1 | 3/2011 | Acres |
| 2011/0111827 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0212711 A1 | 9/2011 | Scott |
| 2011/0223993 A1 | 9/2011 | Allen et al. |
| 2011/0263318 A1 | 10/2011 | Agarwal et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0022871 A1 | 1/2012 | Neelakantan |
| 2012/0034968 A1 | 2/2012 | Watlins et al. |
| 2012/0094769 A1 | 4/2012 | Nguyen et al. |
| 2012/0108319 A1 | 5/2012 | Caputo et al. |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184363 A1 | 7/2012 | Barclay et al. |
| 2012/0190426 A1 | 7/2012 | Acres |
| 2012/0194448 A1 | 8/2012 | Rothkopf |
| 2012/0208618 A1 | 8/2012 | Frerking |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005453 A1 | 1/2013 | Nguyen et al. |
| 2013/0059650 A1 | 3/2013 | Sylia et al. |
| 2013/0065668 A1 | 3/2013 | LeMay |
| 2013/0088830 A1* | 4/2013 | Lim .................. 361/679.43 |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2014/0006129 A1 | 1/2014 | Heath |
| 2014/0094295 A1 | 4/2014 | Nguyen |
| 2014/0179431 A1 | 6/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 2005073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 8/2009 |

OTHER PUBLICATIONS

Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Ilnois at Urbana Champain, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
iAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, mailed Aug. 23, 2013.
Office Action for U.S. Appl. No. 13/633,118, mailed Sep. 20, 2013.
Office Action for U.S. Appl. No. 13/801,256, mailed Jul. 2, 2013.
Notice of Allowance for U.S. Appl. No. 12/619,672, mailed Oct. 3, 2013.

(56) References Cited

OTHER PUBLICATIONS

Notice of Allowance for U.S. Appl. No. 12/757,968, mailed Oct. 11, 2013.
Final Office Action for U.S. Appl. No. 12/797,610, mailed Jul. 10, 2013.
Office Action for U.S. Appl. No. 12/617,717, mailed Jun. 17, 2013.
Notice of Allowance for U.S. Appl. No. 12/757,968, mailed Dec. 18, 2013.
Office Action for U.S. Appl. No. 12/945,889, mailed Dec. 18, 2013.
Office Action for U.S. Appl. No. 13/632,828, mailed Jul. 30, 2013.
Restriction Requirement for U.S. Appl. No. 13/801,256, mailed Dec. 30, 2013.
Office Action for U.S. Appl. No. 13/801,171, mailed Dec. 26, 2013.
Office Action for U.S. Appl. No. 13/801,234, mailed Jan. 10, 2014.
Final Office Action for U.S. Appl. No. 13/296,182, mailed Feb. 12, 2014.
Office Action for U.S. Appl. No. 12/617,717, mailed Feb. 25, 2014.
Office Action for U.S. Appl. No. 13/801,076, mailed Mar. 28, 2014.
Final Office Action for U.S. Appl. No. 13/633,118, mailed Apr. 3, 2014.
Office Action for U.S. Appl. No. 13/843,192, mailed Apr. 3, 2014.
Office Action for U.S. Appl. No. 13/632,743, mailed Apr. 10, 2014.
Office Action for U.S. Appl. No. 13/801,121, mailed Apr. 11, 2014.
Final Office Action for U.S. Appl. No. 12/945,889, mailed Jun. 30, 2014.
Notice of Allowance for U.S. Appl. No. 12/617,717, mailed Jul. 14, 2014.
Office Action for U.S. Appl. No. 13/801,121, mailed Sep. 24, 2014.
Office Action for U.S. Appl. No. 13/801,171, mailed Sep. 22, 2014.
Office Action for U.S. Appl. No. 13/801,234, mailed Oct. 1, 2014.
Final Office Action for U.S. Appl. No. 13/843,192, mailed Oct. 21, 2014.
Office Action for U.S. Appl. No. 13/632,743, mailed Oct. 23, 2014.
Office Action for U.S. Appl. No. 12/945,889, mailed Oct. 23, 2014.
Office Action for U.S. Appl. No. 13/632,828, mailed Nov. 7, 2014.
Office Action for U.S. Appl. No. 12/797,610, mailed Dec. 15, 2014.
Final Office Action for U.S. Appl. No. 12/945,889, mailed Feb. 12, 2015.
Final Office Action for U.S. Appl. No. 13/801,171, mailed Mar. 16, 2015.
Office Action for U.S. Appl. No. 13/833,116, mailed Mar. 15, 2015.
Office Action for U.S. Appl. No. 13/632,828, mailed Apr. 10, 2015.
Final Office Action for U.S. Appl. No. 13/801,121, mailed Apr. 21, 2015.
Final Office Action for U.S. Appl. No. 13/557,063, mailed Apr. 28, 2015.
Office Action for U.S. Appl. No. 13/296,182, mailed Jun. 5, 2015.
Office Action for U.S. Appl. No. 13/843,192, mailed Mar. 15, 2013.
Office Action for U.S. Appl. No. 12/797,610, mailed Jul. 14, 2015.
Notice of Allowance for U.S. Appl. No. 12/945,889, mailed Jul. 22, 2015.
Office Action for U.S. Appl. No. 12/797,616, mailed Aug. 10, 2015.
Final Office Action for U.S. Appl. No. 13/801,234, mailed Aug. 14, 2015.
Final Office Action for U.S. Appl. No. 13/833,116, mailed Sep. 24, 2015.
Office Action for U.S. Appl. No. 13/801,121, mailed Oct. 2, 2015.
Office Action for U.S. Appl. No. 14/017,150, mailed Oct. 7, 2015.
Office Action for U.S. Appl. No. 14/017,159, mailed Oct. 7, 2015.

\* cited by examiner

GAMING DEVICE DOCKING STATION

CROSS-REFERENCE TO RELATED APPLICATIONS

This application is related to U.S. application Ser. No. 13/833,116, filed Mar. 15, 2013, and entitled "PORTABLE INTERMEDIARY TRUSTED DEVICE," which is hereby incorporated by reference herein in its entirety for all purposes.

BACKGROUND OF THE INVENTION

It is often the case that people go with friends to gaming establishments for the purpose of being social and enjoying playing games of chance in one another's company. However, more than likely, at least one person in the group will disagree in which activities to engage in. In gaming establishments, one person may want to play video poker while another would want to play a game of craps. Several other people in the group may even want to play different slot machines. This can be particularly troublesome when the purpose of the excursion is to be social, yet the people separate in order to engage in their respective preferred activities.

There may be times when at least one person in the group is disappointed with the activity in which the group is engaged in, and it is likely that significant compromises must be made in order to accommodate all members of a group. This can lead to people spending less money in a gaming establishment by reducing the desire to engage in the current activity for at least one person in the group and/or by quickly taxing the overall patience of the group which would otherwise be willing to engage in gaming activities for longer periods of time. It may be preferable to allow at least one or more of the group members to play their preferred game of chance on a mobile or portable gaming device in order to prevent such issues.

SUMMARY

The present invention relates to docking stations, such as docking stations configured for use in gaming establishments. The docking stations can be configured to create trusted mobile electronic devices which can be used to play games of chance in gaming establishments.

In one embodiment, a docking station configured to authorize a mobile electronic device to play games of chance may have a receiver configured to receive the mobile electronic device, and a processor configured to: (i) detect whether the mobile electronic device has been received by the receiver; (ii) receive device information from the mobile electronic device if it is detected that the mobile electronic device is received by the receiver; (iii) determine whether the games of chance can be played on the mobile electronic device based on the received device information; (iv) authorize the mobile electronic device to play the games of chance; and (v) transmit gaming data to the mobile electronic device if it is determined that the games of chance can be played on the mobile electronic device and if the mobile electronic device is authorized.

In one embodiment, a method for authorizing a mobile electronic device to play games of chance using a docking station may include detecting that the mobile electronic device is coupled to the portable docking station, receiving device information from the mobile electronic device after it is detected that the mobile electronic device has been coupled to the portable docking station, determining whether the games of chance can be played on the mobile electronic device based on the received device information, authorizing the mobile electronic device for playing the games of chance, transmitting gaming data to the mobile electronic device if it is determined that the games of chance can be played on the mobile electronic device and if the mobile electronic device is authorized.

In another embodiment, a method for converting a mobile electronic device to a trusted mobile electronic device using a portable docking station may include detecting that the mobile electronic device is coupled to the portable docking station, receiving device information from the mobile electronic device after it is detected that the mobile electronic device has been coupled to the portable docking station, determining whether games of chance can be played on the mobile electronic device based on the received device information, authorizing a user to play the games of chance on the mobile electronic device, converting the mobile electronic device to the trusted mobile electronic device if the user is authorized to play the games of chance on the mobile electronic device, and transmitting gaming data to the trusted mobile electronic device if the mobile electronic device is converted to a trusted mobile electronic device.

In one embodiment, a system to authorize a mobile electronic device to play games of chance may include a gaming system manager and a portable docking station configured to communicate with the gaming system manager and the mobile electronic device, the portable docking station further configured to: (i) detect whether the mobile electronic device is connected to a receiver of the portable docking station; (ii) receive device information from the mobile electronic device if it is detected that the mobile electronic device is connected to the receiver; (iii) determine whether the games of chance can be played on the mobile electronic device based on the received device information; (iv) authorize the mobile electronic device to play the games of chance; and (v) transmit gaming data to the mobile electronic device if it is determined that the games of chance can be played on the mobile electronic device and if the mobile electronic device is authorized, wherein once the mobile electronic device is authorized to play the games of chance, the mobile electronic device is deemed a trusted gaming device for use within the gaming system manager of a gaming establishment.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Embodiments are described herein in the context of a gaming device docking station. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The components, process steps, and/or data structures may be implemented using various types of operating systems, computing platforms, computer programs, and/or general purpose machines may be used to carry out the invention. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The gaming device docking station, or other hardware and/or software stored in a machine-readable medium (e.g., a tangible storage medium), can perform associated methods or processes. These and other features will be presented in more detail in the following the description of the invention and the associated figures.

Figure 1:
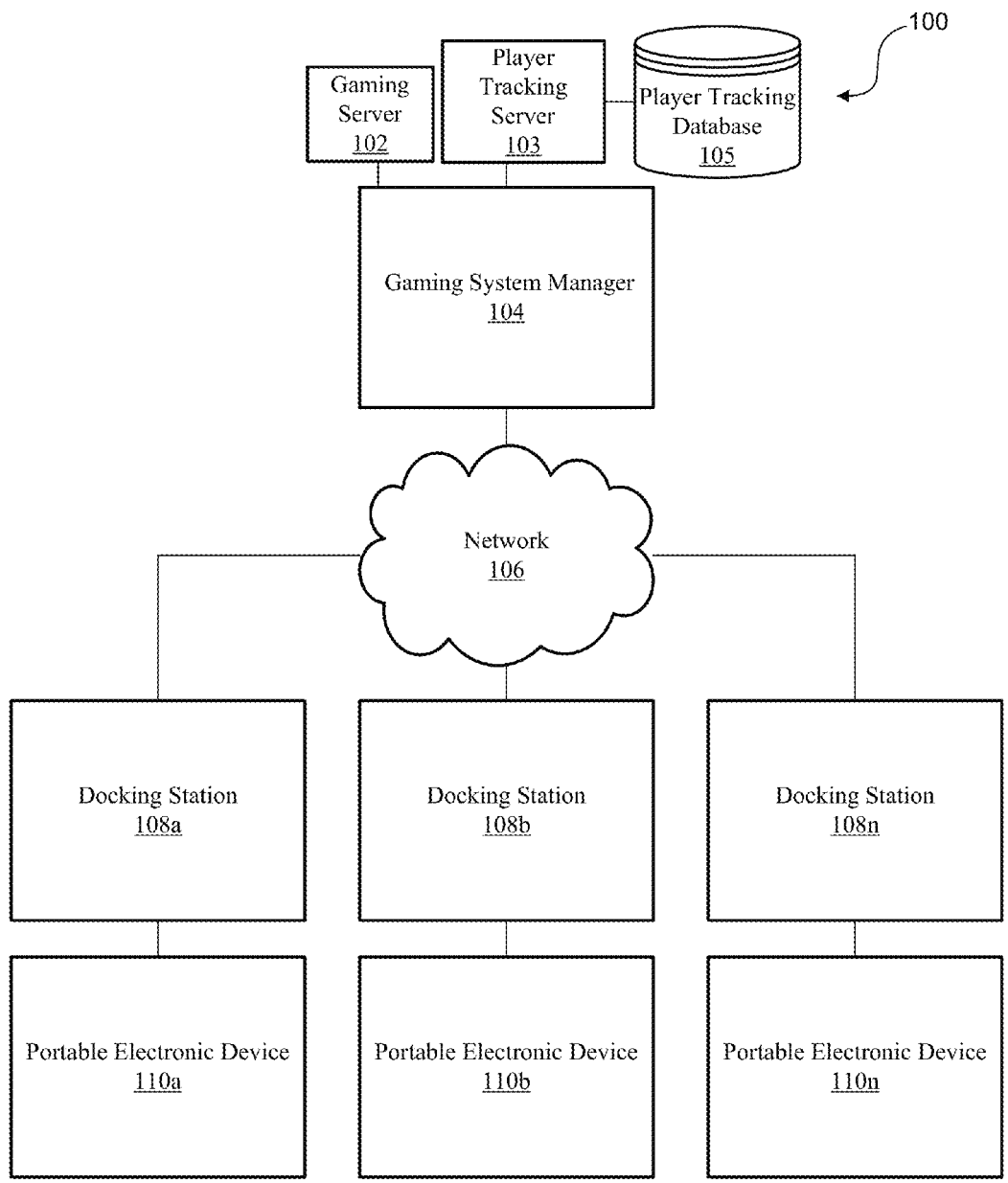
FIG. 1 illustrates a block diagram of an example system to authorize a portable electronic device to play games of chance.

FIG. 1 illustrates a block diagram of an example system to authorize a portable electronic device to play games of chance. The system 100 may have a gaming server 102, a gaming system manager 104, a network 106, a plurality of docking stations 108a-n (where n is an integer), and a plurality of mobile or portable electronic devices 110a-n.

Mobile electronic devices 110a-n may be any portable electronic device such as mobile telephones, tablet computers, laptop computers, handheld gaming devices, media players, or any other mobile electronic device having the capability to play a game of chance.

The docking station 108a-n may be configured to receive and/or detect whether the mobile electronic device 110a-n is connected to the docking station 108a-n. In one embodiment, the docking station 108a-n may have a receiver configured to physically receive the mobile electronic device 110a-n. In another embodiment, the mobile electronic device may be detected by the docking station via any wired or wireless means. For example, an external connector or dongle may be used to connect or couple the docking stations 108a-n and the mobile electronic device 110a-n. In another example, the mobile electronic device 110a-n may be detected by the docking station 108a-n via any known wireless methods or device such as a 3G wireless technology, 4G wireless technology, Bluetooth, Wireless USB, Near-field magnetic, Fire Wire, WiMax, IEEE 802.11x technology, radio frequency, and the like. Detection of the mobile electronic device 110a-n may be initiated by a graphical user interface on the docking station 108a-n or the mobile electronic device 110a-n.

Once the mobile electronic device 110a-n is detected by the docking station 108a-n, mobile device information may be transmitted from the mobile electronic device 110a-n to the docking station 108a-n. Mobile device information may be any information necessary to determine whether the mobile device has the capability to play games of chance, authenticate the mobile electronic device 110a-n, validate or authenticate the user of the mobile electronic device 110a-n, or any other desired information may be transmitted to the docking station 108a-n. For example, mobile device information may include the mobile electronic device 110a-n capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

The docking station 108a-n may be configured to determine whether games of chance can be played on the mobile electronic device 110a-n based on the received mobile device information. For example, the docking station 108a-n may determine whether the mobile electronic device 110a-n is compatible with software residing of the docking station 108a-n, the gaming system manager 104, or the gaming server 102 in order to play the game of chance. The docking station 108a-n may also be configured to determine whether the mobile electronic device 110a-n has enough memory to play the games of chance.

In one embodiment, if the mobile electronic device 110a-n is physically connected to docking station 108a-n either wired, by a connector, or received by the receiver of the docking station 108a-n, docking station 108a-n may be configured to provide a charge to the mobile electronic device 110a-n. In another embodiment, if the mobile electronic device 110a-n is physically connected to docking station 108a-n wirelessly, the charge to the mobile electronic device 110*a-n* may be transmitted via electromagnetic induction or any other similar methods used to provide charges wirelessly.

Docking station 108*a-n* may be configured to authenticate the mobile electronic device 110*a-n* to play games of chance based upon the received mobile device information. In one embodiment, using a user interface either on the docking station 108*a-n* and/or on the mobile electronic device 110*a-n*, the user may be requested to enter a username, password, account number, player tracking information, facial recognition information, voice recognition information, or any other desired user information. In another embodiment, the desired user information necessary to authenticate the mobile electronic device 110*a-n* and/or user may be embedded in the mobile electronic device 110*a-n* such that authentication may be completed automatically without any user interaction.

To authenticate the mobile electronic device and the user, the received mobile device information may be compared to information stored on the gaming system manager 104. The docking station 108*a-n* may be configured to communicate with the gaming system manager 104 by any known means such as wired or wirelessly. The gaming system manager 104 may have a player tracking server 103 having a player database 105 configured to store all user information, player tracking information, and any other desired player information. If the received mobile electronic information matches the information stored in the player tracking server 103, the docking station 108*a-n* may authenticate the mobile electronic device 110*a-n* such that the mobile electronic device 110*a-n* then becomes a trusted gaming electronic device.

In one embodiment, the comparison of the received mobile device information and the information stored on the player tracking server 103 may be conducted at the docking station 108*a-n*. In this embodiment, the docking station 108*a-n* may be configured to receive the player tracking information from the gaming system manager 104. In another embodiment, the comparison of the received mobile device information and the information stored on the player tracking server 103 may be conducted by the gaming system manager 104. In this embodiment, the docking station 108*a-n* may be configured to transmit the received mobile device information to the gaming system manager 104 for comparison. If the information match, the gaming system manager 104 may transmit an authentication signal to the docking station 108*a-n*. If the information does not match, the gaming system manager 104 may transmit a rejection signal to the docking station 108*a-n*.

Once authenticated, the docking station 108*a-n* may receive a request to play a game of chance from the mobile electronic device 110*a-n*. If the docking station 108*a-n* determined that the mobile electronic device 110*a-n* is capable of playing games of chance, in one embodiment, the docking station 108*a-n* may transmit the request for the game of chance to the gaming system manager 104. The requested game of chance data may be obtained from the gaming server 102 and transmitted to the mobile electronic device 110*a-n*. In another embodiment, the docking station 108*a-n* may determine whether the requested game of chance is stored on the docking station 108*a-n*. If the docking station 108*a-n* determined that the requested game of chance is stored on the docking station 108*a-n*, the docking station 108*a-n* may transmit the requested game of chance data to the mobile electronic device 110*a-n*.

The game of chance data may be downloaded and stored on the mobile electronic device 110*a-n*. In another embodiment, the game of chance data may be streamed to the mobile electronic device 110*a-n*, either from the docking station 108*a-n* or the gaming system manager 104. In this embodiment, user input used to play the game of chance may be transmitted to the docking station 108*a-n* or the gaming system manager 104. User input may be received from the mobile electronic device 110*a-n* and/or the docking station 108*a-n*.

As the game of chance is played, game session data may periodically transmitted to the docking station 108*a-n*. Game session data may be transmitted at any desired time. For example, game session data may be transmitted every thirty seconds, every minute, every fifteen minutes, every hour, or at designated time intervals such as between 1 pm-3 pm, and the like. In one embodiment, game session data may be stored at the docking station 108*a-n*. In another embodiment, the game session data may be received by the docking station 108*a-n* and transmitted to the gaming system manager 104. In still another embodiment, the game session data may be directly received by the gaming system manager 104 from the mobile electronic device 110*a-n*. Game session data may include any data produced during the game play such as game state data, game history data, account data, coins in and out, credits obtained or used, bonuses received, and any other game data. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information.

Since a player may want to move about the gaming establishment (e.g. to see a show, eat dinner, watch their friends play at a table game or other gaming machine, etc.) the mobile electronic device 110*a-n* may be automatically authenticated or received at another docking station 108*a-n* located near the player. For example, if the player was originally authenticated by a docking station 108*a-n* located at the bar and is now eating dinner at the buffet, the mobile electronic device 110*a-n* may be automatically authenticated by a docking station located nearest the buffet. Thus, once a mobile electronic device 110*a-n* has been authenticated by one docking station 108*a-n*, the mobile electronic device 110*a-n* is now deemed a trusted gaming device and may be automatically authenticated when connecting to another docking station 108*a-n* within the gaming establishment.

The mobile electronic device 110*a-n* may be configured to communicate with the second docking station 108*a-n* similar to how it was configured to communicate with the original docking station 108*a-n* (i.e. wirelessly, wired, physically received in a receiver, and/or use of an external connector). The second docking station 108*a-n* may also be configured to receive mobile device information from the mobile electronic device 110*a-n*, transmit the received mobile device information to the gaming system manager 104, transmit and receive gaming session data, and any other desired operations. The second docking station 108*a-n* and/or gaming system manager 104 may determine whether the mobile electronic device 110*a-n* was previously connected to another portable docking station 108*a-n* within the gaming establishment based upon the received mobile device information.

Figure 2:
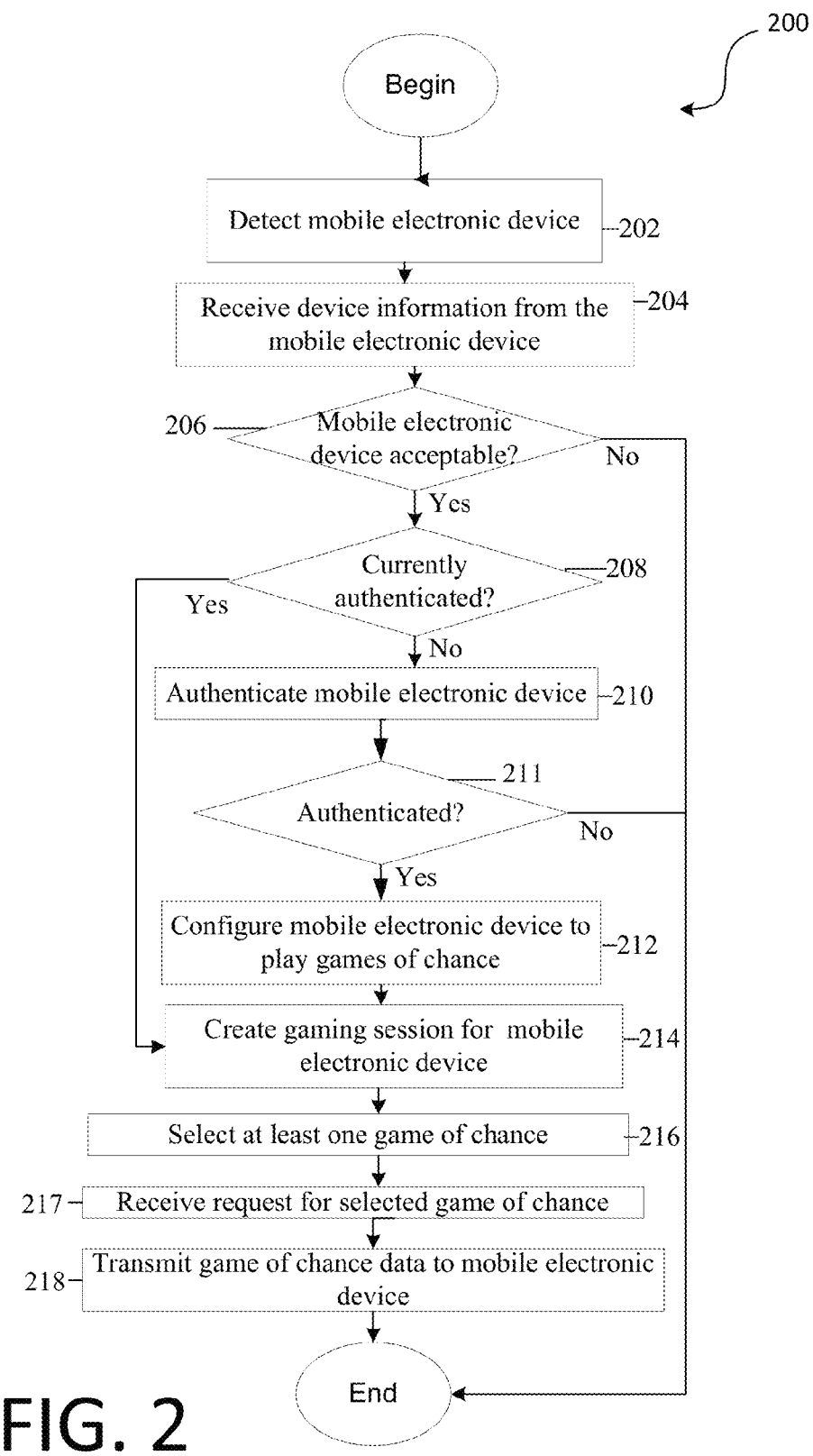
FIG. 2 illustrates a flowchart of an example method for authorizing a mobile electronic device to play games of chance using a docking station.

FIG. 2 illustrates a flowchart of an example method for authorizing a mobile electronic device to play games of chance using a docking station. A mobile electronic device must be authorized, authenticated, and/or validated by a docking station prior to becoming a trusted device that may be used to play games of chance. Mobile electronic devices may be any portable electronic device such as mobile telephones, tablet computers, laptop computers, handheld gaming devices, media players, or any other mobile electronic device having the capability to play a game of chance.

Method 200 starts with detecting a mobile electronic device at 202. The docking station (e.g. docking station 108a-n illustrated in FIG. 1) may be configured to receive and/or detect whether the mobile electronic device is connected to the docking station. In one embodiment, the docking station may have a receiver configured to physically receive the mobile electronic device. In another embodiment, the mobile electronic device may be detected by the docking station via any wired or wireless means. For example, an external connector or dongle may be used to connect or couple the docking stations and the mobile electronic device. In another example, the mobile electronic device may be detected by the docking station via any known wireless methods or device such as a 3G wireless technology, 4G wireless technology, Bluetooth, Wireless USB, Near-field magnetic, Fire Wire, WiMax, IEEE 802.11x technology, radio frequency, and the like. Detection of the mobile electronic device may be initiated by a graphical user interface on the docking station or the mobile electronic device.

Device information may be obtained from the mobile electronic device at 204. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

A determination of whether the mobile electronic device is acceptable may be made at 206. In other words, a determination of whether games of chance can be played on the mobile electronic device based on the received mobile device information. The docking station can determine whether the mobile electronic device is acceptable in terms of its technical specifications to play games of chance based on the mobile device information provided by the mobile electronic device. For example, the docking station and/or gaming system manager (e.g. gaming system manager 104 illustrated in FIG. 1) may determine whether the mobile electronic device is compatible with software residing of the docking station, the gaming system manager, or the gaming server (e.g. gaming server 102 illustrated in FIG. 1) in order to play the game of chance. The docking station may also be configured to determine whether the mobile electronic device has enough memory to play the games of chance. In another example, a game of chance may require that a mobile electronic device run a Macintosh operating system, have at least two gigabytes of memory, and have at least four hundred seventy kilobytes of drive space free. If the mobile electronic device cannot satisfy those requirements, the mobile electronic device may not be allowed to play games of chance and thus, not be an acceptable mobile electronic device.

If the mobile electronic device is determined to be an acceptable device at 206 a determination of whether the mobile electronic device is currently authenticated may be made at 208. The mobile electronic device may have been previously authenticated by another docking station within the gaming establishment. Since a player may want to move about the gaming establishment (e.g. to see a show, eat dinner, watch their friends play at a table game or other gaming machine, etc.) the mobile electronic device may be automatically authenticated or received at a second docking station located near the player. For example, if the player was originally authenticated by a docking station located at the bar and is now eating dinner at the buffet, the mobile electronic device may be automatically authenticated by a docking station located nearest the buffet. Thus, once a mobile electronic device has been authenticated by one docking station, the mobile electronic device is now deemed a trusted gaming device and may be automatically authenticated when connecting to another docking station within the gaming establishment.

The mobile electronic device may be configured to communicate with the second docking station similar to how it was configured to communicate with the original docking station (i.e. wirelessly, wired, physically received in a receiver, and/or use of an external connector). The second docking station may also be configured to receive mobile device information from the mobile electronic device, transmit the received mobile device information to the gaming system manager, transmit and receive gaming session data, and any other desired operations. The second docking station and/or gaming system manager may determine whether the mobile electronic device was previously connected to another portable docking station within the gaming establishment based upon the received mobile device information.

If the mobile electronic device is determined to be currently authenticated at 208, a gaming session may be created for the mobile electronic device at 214 at the second docking station. If the mobile electronic device is determined to not be currently authenticated at 208, the mobile electronic device may be authenticated at 210.

Docking station may be configured to authenticate the mobile electronic device to play games of chance based upon the received mobile device information. In one embodiment, using a user interface either on the docking station and/or on the mobile electronic device, the user may be requested to enter a username, password, account number, player tracking information, facial recognition information, voice recognition information, or any other desired user information. In another embodiment, the desired user information necessary to authenticate the mobile electronic device and/or user may be embedded in the mobile electronic device such that authentication may be completed automatically without any user interaction.

To authenticate the mobile electronic device and the user, the received mobile device information may be compared to information stored on the gaming system manager. The docking station may be configured to communicate with the gaming system manager by any known means such as wired or wirelessly. The gaming system manager may have a player tracking server (e.g. player tracking server 103 illustrated in FIG. 1) having a player database configured to store all user information, player tracking information, and any other desired player information. A determination of whether the mobile electronic device is authenticated may be made at 211. If the received mobile electronic information matches the information stored in the player tracking server, the docking station may authenticate the mobile electronic device at 211 such that the mobile electronic device then becomes a trusted gaming electronic device that may be used to play games of chance. If the received mobile electronic information does not match the information stored in the player tracking server, the docking station may not authenticate the mobile electronic device at 211 and the method 200 may end.

In one embodiment, the comparison of the received mobile device information and the information stored on the player tracking server may be conducted at the docking station. In this embodiment, the docking station may be configured to receive the player tracking information from the gaming system manager. In another embodiment, the comparison of the received mobile device information and the information stored on the player tracking server may be conducted by the gaming system manager. In this embodiment, the docking station may be configured to transmit the received mobile device information to the gaming system manager for comparison. A determination of whether the mobile electronic device is authenticated may be made at 211. If the information matches, the gaming system manager may transmit an authentication signal to the docking station and the mobile electronic device may be authenticated at 211. If the information does not match, the gaming system manager may transmit a rejection signal to the docking station and the mobile electronic device may not be authenticated at 211 and the method 200 may end.

If the mobile electronic device is authenticated at 211, docking station may configure the mobile electronic device to play the games of chance at 212. In one example, space in the memory of the mobile electronic device may be dedicated for use to play the game of chance. In another example, secure software to prevent cheating, hacking, and/or to comply with any gaming regulations or laws may be required to be downloaded to the mobile electronic device.

A gaming session may then be created for the mobile electronic device at 214. For example, creating a gaming session may include creating a player tracking account, if no player traction account was created for the user. In another example, creating a gaming session may include creating an account for the mobile electronic device to save and store game session data. The game session data stored in the gaming database may include game state data, game history data, account data, and the like. Game state data may show a position in a game, game progress, a current account balance, active bets placed, pending game outcomes, and the like. The game history data may include games of chance played, wagers made, past account balances, game progress, outcomes of games of chance, and the like. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information.

In still another example, creating the gaming session may include transmitting a list of the games of chance, establishing a link to a player tracking account, and any other desired actions to create a gaming session. The list of games of chance may be customized based upon the user interests, randomly provided, include a summary of each game of chance, and any other information about each of the games of chance. The list of the games of chance may be presented on either the mobile electronic device or the docking station.

Creating the gaming session may also allow the user to easily access and transfer funds to play the game of chance and/or cash out the remaining funds in the gaming session. For example, the gaming session may store the amount of funds received and remaining for the gaming session.

In one embodiment, the funds stored in the gaming session may be used to play the games of chance. In another embodiment, the funds stored in the gaming session may be used for non-gaming purposes, such as paying for a hotel stay, watch a movie, eat at the buffet, play bowling, and any other purchases.

At least one game of chance may be selected at 216. Using the mobile electronic device and/or the docking station, the player may select a game of chance to play. If selected using the mobile electronic device, a request for the selected game of chance may be received by the docking station at 217. If selected using the docking station, a request for the selected game of chance may be received by to the gaming system manager at 217.

The requested game of chance may be transmitted to the mobile electronic device at 218. The requested game of chance data may be obtained from the gaming server and transmitted to the mobile electronic device. In another embodiment, the docking station may determine whether the requested game of chance is stored on the docking station. If the docking station determines that the requested game of chance is stored on the docking station, the docking station may transmit the requested game of chance data to the mobile electronic device.

The game of chance data may be downloaded and stored on the mobile electronic device. In another embodiment, the game of chance data may be streamed to the mobile electronic device, either from the docking station or the gaming system manager. In this embodiment, user input used to play the game of chance may be transmitted to the docking station or the gaming system manager. User input may be received from the mobile electronic device and/or the docking station.

Figure 3A:
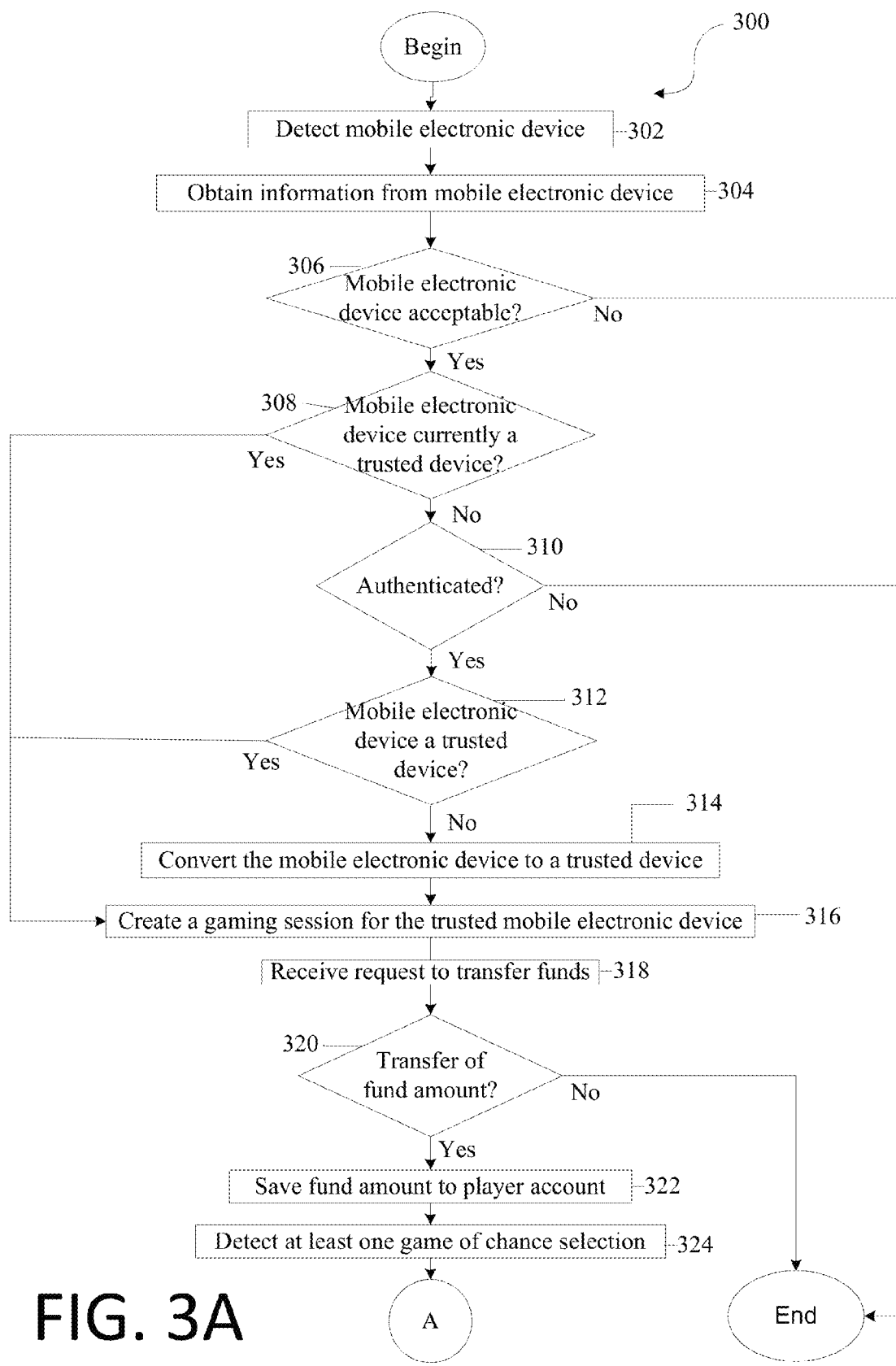
FIGS. 3A-3B illustrate flowcharts of an example method for converting a mobile electronic device to a trusted mobile electronic device using a docking station.
Figure 3B:
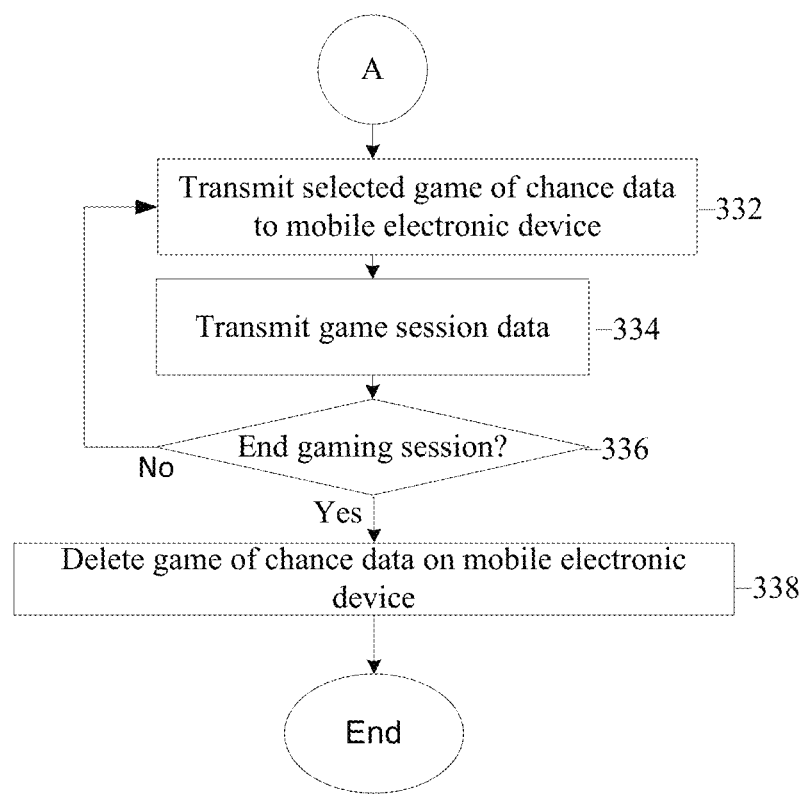

FIGS. 3A-3B illustrate flowcharts of an example method for converting a mobile electronic device to a trusted mobile electronic device using a docking station. As illustrated in FIG. 3A, the method 300 may start with detecting a mobile electronic device at 302. A mobile electronic device must be authorized, authenticated, and/or validated by a docking station in order to become a trusted device capable of being used to play games of chance. Mobile electronic devices may be any portable electronic device such as mobile telephones, tablet computers, laptop computers, handheld gaming devices, media players, or any other mobile electronic device having the capability to play a game of chance.

Method 300 starts with detecting a mobile electronic device at 302. The docking station (e.g. docking station 108*a-n* illustrated in FIG. 1) may be configured to receive and/or detect whether the mobile electronic device is connected to the docking station. In one embodiment, the docking station may have a receiver configured to physically receive the mobile electronic device. In another embodiment, the mobile electronic device may be detected by the docking station via any wired or wireless means. For example, an external connector or dongle may be used to connect or couple the docking stations and the mobile electronic device. In another example, the mobile electronic device may be detected by the docking station via any known wireless methods or device such as a 3G wireless technology, 4G wireless technology, Bluetooth, Wireless USB, Near-field magnetic, Fire Wire, WiMax, IEEE 802.11x technology, radio frequency, and the like. Detection of the mobile electronic device may be initiated by a graphical user interface on the docking station or the mobile electronic device.

Mobile device information may be obtained from the mobile electronic device at 304. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

A determination of whether the mobile electronic device is acceptable may be made at 306. In other words, a determination of whether games of chance can be played on the mobile electronic device based on the received mobile device information. The docking station can determine whether the mobile electronic device is acceptable in terms of its technical specifications to play games of chance based on the mobile device information provided by the mobile electronic device. For example, the docking station and/or gaming system manager (e.g. gaming system manager 104 illustrated in FIG. 1) may determine whether the mobile electronic device is compatible with software residing of the docking station, the gaming system manager, or the gaming server (e.g. gaming server 102 illustrated in FIG. 1) in order to play the game of chance. The docking station may also be configured to determine whether the mobile electronic device has enough memory to play the games of chance. In another example, a game of chance may require that a mobile electronic device run a Macintosh operating system, have at least two gigabytes of memory, and have at least four hundred seventy kilobytes of drive space free. If the mobile electronic device cannot satisfy those requirements, the mobile electronic device may not be allowed to play games of chance and thus, not be an acceptable mobile electronic device.

If the mobile electronic device is determined to be an acceptable device at 306 a determination of whether the mobile electronic device is currently authenticated may be made at 308. The mobile electronic device may have been previously authenticated by another docking station within the gaming establishment. Since a player may want to move about the gaming establishment (e.g. to see a show, eat dinner, watch their friends play at a table game or other gaming machine, etc.) the mobile electronic device may be automatically authenticated or received at a second docking station located near the player. For example, if the player was originally authenticated by a docking station located at the bar and is now eating dinner at the buffet, the mobile electronic device may be automatically authenticated by a docking station located nearest the buffet. Thus, once a mobile electronic device has been authenticated by one docking station, the mobile electronic device is now deemed a trusted gaming device and may be automatically authenticated when connecting to another docking station within the gaming establishment.

The mobile electronic device may be configured to communicate with the second docking station similar to how it was configured to communicate with the original docking station (i.e. wirelessly, wired, physically received in a receiver, and/or use of an external connector). The second docking station may also be configured to receive mobile device information from the mobile electronic device, transmit the received mobile device information to the gaming system manager, transmit and receive gaming session data, and any other desired operations. The second docking station and/or gaming system manager may determine whether the mobile electronic device was previously connected to another portable docking station within the gaming establishment based upon the received mobile device information.

A determination of whether the mobile electronic device is authenticated may be made at 310. Docking station may be configured to authenticate the mobile electronic device to play games of chance based upon the received mobile device information. In one embodiment, using a user interface either on the docking station and/or on the mobile electronic device, the user may be requested to enter a username, password, account number, player tracking information, facial recognition information, voice recognition information, or any other desired user information. In another embodiment, the desired user information necessary to authenticate the mobile electronic device and/or user may be embedded in the mobile electronic device such that authentication may be completed automatically without any user interaction.

To authenticate the mobile electronic device and the user, the received mobile device information may be compared to information stored on the gaming system manager. The docking station may be configured to communicate with the gaming system manager by any known means such as wired or wirelessly. The gaming system manager may have a player tracking server (e.g. player tracking server 103 illustrated in FIG. 1) having a player database configured to store all user information, player tracking information, and any other desired player information. If the received mobile electronic information matches the information stored in the player tracking server, the docking station may determine that the mobile electronic device is authenticated at 310. If the received mobile electronic information does not match the information stored in the player tracking server, the mobile electronic device is not authenticated at 310 and the method 300 may end.

In one embodiment, the comparison of the received mobile device information and the information stored on the player tracking server may be conducted at the docking station. In this embodiment, the docking station may be configured to receive the player tracking information from the gaming system manager. In another embodiment, the comparison of the received mobile device information and the information stored on the player tracking server may be conducted by the gaming system manager. In this embodiment, the docking station may be configured to transmit the received mobile device information to the gaming system manager for comparison. If the information matches, the gaming system manager may transmit an authentication signal to the docking station and a determination of whether the mobile electronic device is a trusted device may be made at 312. If the information does not match, the gaming system manager may transmit a rejection signal to the docking station and the method 300 may end.

In order to become a trusted device, the mobile electronic device must be authenticated and secured. Thus, if the mobile electronic device is determined to be authenticated at 310, a determination of whether the mobile electronic device is trusted may be made at 312. To be configured to play games of chance, the mobile electronic device must provide for security features to prevent cheating, hacking, and/or to comply with any gaming regulations or laws. In one embodiment, the security features may deny access to all programs or applications on the mobile electronic device except the programs or applications necessary to play the game of chance. If the mobile electronic device contains the desired security features, the mobile electronic device may be considered a trusted device at 312.

If the desired security features are not located on the mobile electronic device, the device is deemed to not be a trusted device at 312. If not a trusted device at 312, the mobile electronic device may be converted to a trusted mobile electronic device at 314. The docking station and/or the gaming system manager may determine what secure software and/or applications are necessary for the mobile electronic device to have to become a trusted device. The secure software may then be downloaded to the mobile electronic device. Once the secured software and/or applications are downloaded and saved to the mobile electronic device, the mobile electronic device may be converted to a trusted device at 314.

If the mobile electronic device is already trusted, the docking station may create a gaming session for the trusted mobile electronic device at 316. For example, creating a gaming session may include creating a player tracking account, if the player did not have an existing player tracking account. In another example, creating a gaming session may include creating an account for the mobile electronic device to save and store game session data. The game session data stored in the gaming database may include game state data, game history data, account data, and the like. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information.

Game state data may show a position in a game, game progress, a current account balance, active bets placed, pending game outcomes, and the like. The game history data may include games of chance played, wagers made, past account balances, game progress, outcomes of games of chance, and the like. In still another example, creating the gaming session may include transmitting a list of the games of chance that may be played on the mobile electronic device, establishing a link to a player tracking account, and any other desired actions to create a gaming session. The list of games of chance may be customized based upon the user interests, randomly provided, include a summary of each game of chance, and any other information about each of the games of chance. The list of the games of chance may be presented on either the mobile electronic device or the docking station.

A request for a fund transfer may be received at 318 by the docking station. The fund transfer amount may include a fund amount, the amount requested to be transferred and used to play the game of chance, and a fund account. The fund account may be a bank, the gaming establishment where the player has a player tracking account, or any other fund account or source from where the fund amount may be obtained. The fund amount may also be used for non-gaming purposes, such as purchasing drinks, paying for a hotel stay, and the like. The fund amount may be monetary or non-monetary, such as credits, player tracking points, and the like.

In one embodiment, the docking station may transmit the fund transfer request to the fund account. In another embodiment, the docking station may transmit the fund transfer request to the gaming management server. The gaming management server may then transmit the fund transfer request to the fund account.

A determination of whether funds were transferred may be made at 320. If the docking station receives the fund amount, the fund amount may be saved to a player account at 322. The player account may be the player's tracking account, the gaming session account, or any other player account. If no fund amount was received at the docking station, the method 300 may end. The docking station may not receive the fund amount for various reasons such as an insufficient account balance, the player leaves the gaming establishment prior to the transfer of funds, the mobile electronic device is no longer a trusted device, the player using the mobile electronic device is underage, the mobile electronic device is incapable of playing games of chance, the request fund amount is prohibited by law, the player has already requested the maximum amount allowed by law, the mobile electronic device has a low battery charge, or any other reasons.

Having created the gaming session at 316, the user may easily access and transfer funds to play the game of chance and/or cash out the remaining funds in the gaming session. For example, the gaming session may store the amount of funds received and remaining for the gaming session.

At least one game of chance selection may be detected at 324. A player may select a game of chance to play on the mobile electronic device using controls on the mobile electronic device and/or the docking station. If selected using the mobile electronic device, a request for the selected game of chance may be transmitted at 217 to the docking station. If selected using the docking station, a request for the selected game of chance may be transmitted at 217 to the gaming system manager.

The requested game of chance may be transmitted to the mobile electronic device at 332. The requested game of chance data may be obtained from the gaming server and transmitted to the mobile electronic device. In another embodiment, the docking station may determine whether the requested game of chance is stored on the docking station. If the docking station determines that the requested game of chance is stored on the docking station, the docking station may transmit the requested game of chance data to the mobile electronic device.

The game of chance data may be downloaded and stored on the mobile electronic device. In another embodiment, the game of chance data may be streamed to the mobile electronic device, either from the docking station or the gaming system manager. In this embodiment, user input used to play the game of chance may be transmitted to the docking station or the gaming system manager. User input may be received from the mobile electronic device and/or the docking station.

Game session data may be transmitted at 334. Game session data may include any data produced during the game play such as game state data, game history data, account data, coins in and out, credits obtained or used, bonuses received, and any other game data. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information. Game state data may show a position in a game, game progress, a current account balance, active bets placed, pending game outcomes, and the like. The game history data may include games of chance played, wagers made, past account balances, game progress, outcomes of games of chance, and the like. As the game of chance is played, game session data may periodically transmitted to the docking station. Game session data may be transmitted at any desired time. For example, game session data may be transmitted every thirty seconds, every minute, every fifteen minutes, every hour, or at designated time intervals such as between 1 pm-3 pm, and the like. In one embodiment, game session data may be stored at the docking station. In another embodiment, the game session data may be received by the docking station and transmitted to the gaming system manager. In still another embodiment, the game session data may be directly received by the gaming system manager from the mobile electronic device.

A determination of whether the gaming session should end may be made at 336. The gaming session may end for a variety of reasons such as no more credits to play the game of chance, insufficient account balance, the player leaves the vicinity in which the mobile electronic device is trusted, the mobile electronic device is no longer capable of playing the game of chance, the mobile electronic device is in an area where playing games of chance is prohibited, the battery charge of the mobile electronic device is low, or for any legal reasons.

If it is determined that the gaming session should end at 336, any game of chance data stored on the mobile electronic device may be deleted at 338. Any game session data as well as security software downloaded on the mobile electronic device may also be deleted. If it is determined that the gaming session should not end at 336, game of chance data may continue to be provided to the mobile electronic device at 332.

Figure 4:
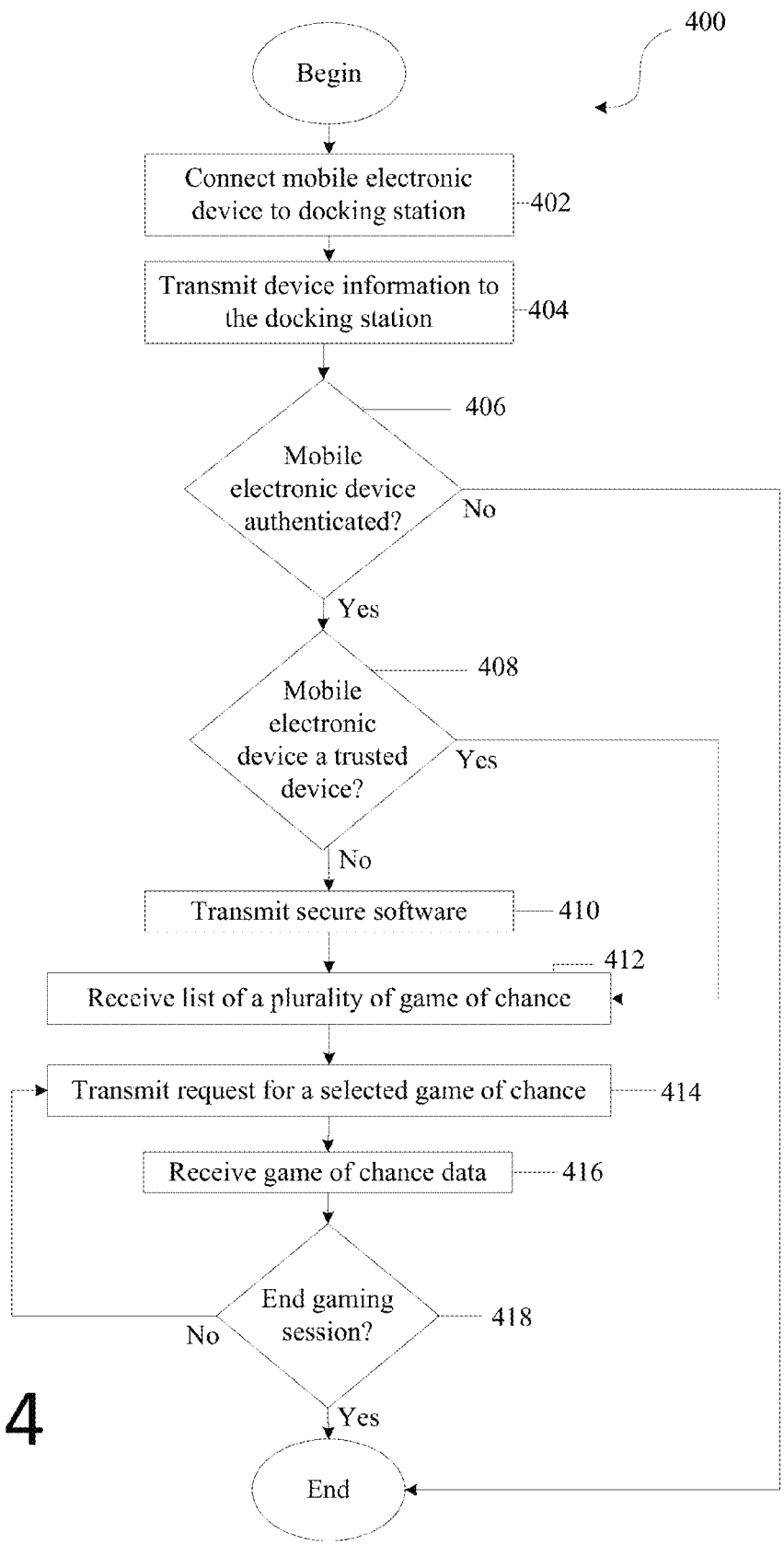
FIG. 4 illustrates a flowchart of an example method for authorizing a mobile electronic device using a docking station.

FIG. 4 illustrates a flowchart of an example method for authorizing a mobile electronic device using a docking station. The method 400 may begin by connecting a mobile electronic device to a docking station at 402. The mobile electronic device may be any device such as mobile telephones, tablet computers, laptop computers, handheld gaming devices, media players, and the like. The connection to the docking station may be via a wired, wireless, or a physical connection to the docking station. In one embodiment, a connector on a receiver of the docking station may be used to connect the mobile electronic device to the docking station. The connector may be designed to receive the mobile electronic device and configured to detect whether the mobile electronic device is physically connected to the docking station. The connector may be designed or configured to allow the mobile electronic device to communicate with the docking station.

In another embodiment, an intermediary connector (e.g. intermediary connector 502 described in detail with reference to FIG. 5A) may be used to connect the mobile electronic device to the receiver. The intermediary connector may be a universal connector to allow all types of mobile electronic devices to communicate with the docking station. The intermediary connector 502 may have a plurality of inputs configured to receive the mobile electronic device or a wire connection to the mobile electronic device. Each of the plurality of inputs may have a different configuration to receive different mobile electronic devices. The intermediary connector 502 may also have an external wire 512 configured to be received by a mobile electronic device. This allows connection to the docking station 500 to be a wired connection.

Figure 6:
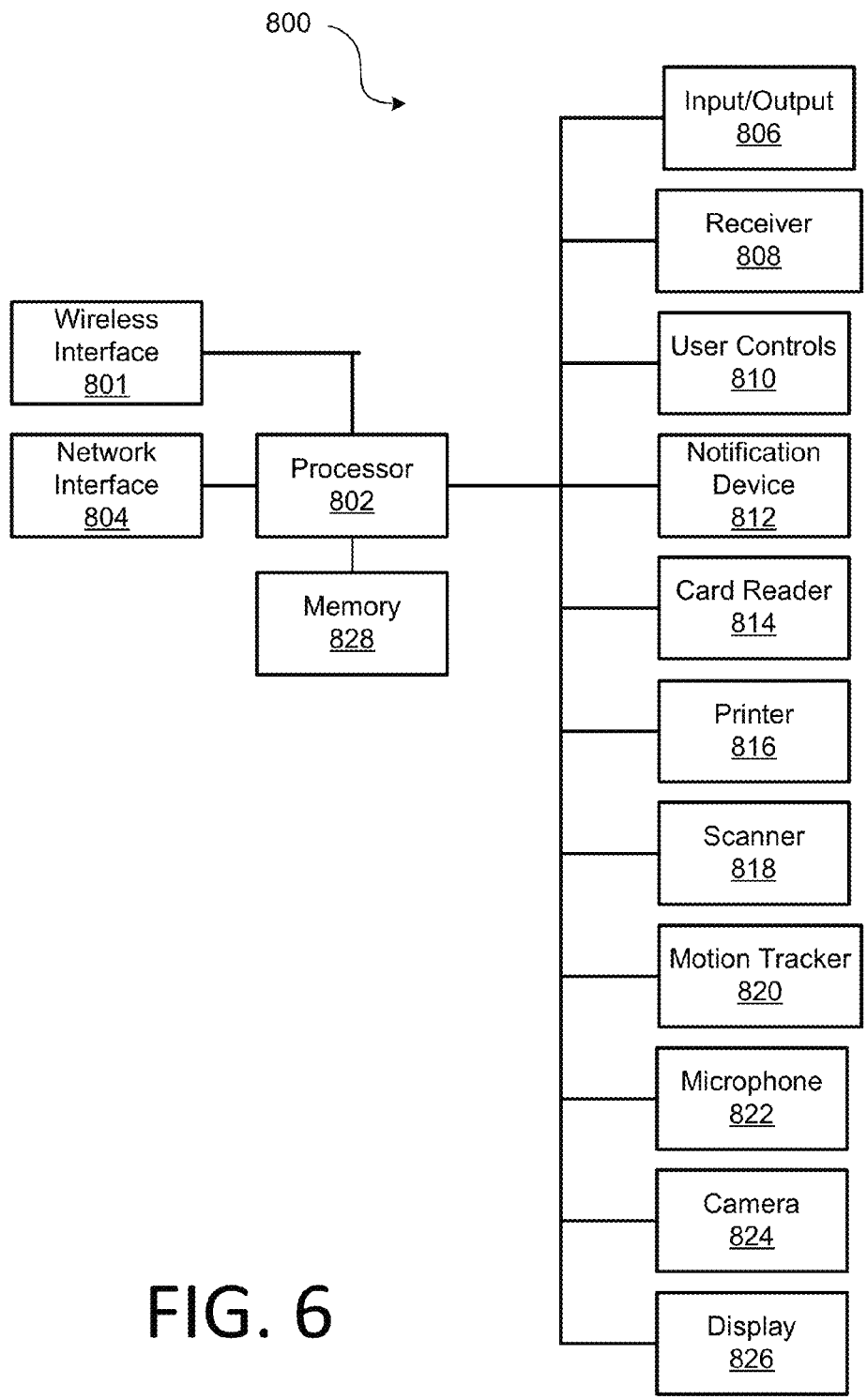
FIG. 6 illustrates a block diagram of an example docking station.

In another embodiment, the docking station may have a wireless receiver (as illustrated in FIG. 6) to connect the mobile electronic device to the docking station wirelessly. Any known wireless methods may be used such as a 3G wireless technology, 4G wireless technology, Bluetooth, Wireless USB, Near-field magnetic, Fire Wire, WiMax, IEEE 802.11x technology, radio frequency, and the like.

Device information may be transmitted to the docking station at 404. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

A determination of whether the mobile electronic device is authenticated may be made at 406 based on the transmitted mobile device information. Docking station may be configured to authenticate the mobile electronic device to play games of chance based upon the received mobile device information. In one embodiment, using a user interface either on the docking station and/or on the mobile electronic device, the user may be requested to enter a username, password, account number, player tracking information, facial recognition information, voice recognition information, or any other desired user information. In another embodiment, the desired user information necessary to authenticate the mobile electronic device and/or user may be embedded in the mobile electronic device such that authentication may be completed automatically without any user interaction.

To authenticate the mobile electronic device and the user, the received mobile device information may be compared to information stored on the gaming system manager. The docking station may be configured to communicate with the gaming system manager by any known means such as wired or wirelessly. The gaming system manager may have a player tracking server (e.g. player tracking server 103 illustrated in FIG. 1) having a player database configured to store all user information, player tracking information, and any other desired player information. If the received mobile electronic information matches the information stored in the player tracking server, the docking station may determine that the mobile electronic device is authenticated at 310. If the received mobile electronic information does not match the information stored in the player tracking server, the mobile electronic device is not authenticated at 310 and the method 400 may end.

In one embodiment, the comparison of the received mobile device information and the information stored on the player tracking server may be conducted at the docking station. In this embodiment, the docking station may be configured to receive the player tracking information from the gaming system manager. In another embodiment, the comparison of the received mobile device information and the information stored on the player tracking server may be conducted by the gaming system manager. In this embodiment, the docking station may be configured to transmit the received mobile device information to the gaming system manager for comparison. If the information matches, the gaming system manager may transmit an authentication signal to the docking station and a determination of whether the mobile electronic device is a trusted device may be made at 408. If the information does not match, the gaming system manager may transmit a rejection signal to the docking station and the method 400 may end.

In order to become a trusted device, the mobile electronic device must be authenticated and secured. Thus, if the mobile electronic device is determined to be authenticated at 406, a determination of whether the mobile electronic device is trusted may be made at 408 based on the transmitted mobile device information. To be configured to play games of chance, the mobile electronic device must provide for security features to prevent cheating, hacking, and/or to comply with any gaming regulations or laws. In one embodiment, the security features may deny access to all programs or applications on the mobile electronic device except the programs or applications necessary to play the game of chance. If the mobile electronic device contains the desired security features, based on the received mobile device information, the mobile electronic device may be considered a trusted device at 408.

If the desired security features are not located on the mobile electronic device, the device is deemed to not be a trusted device at 408, the required security software or applications may be received by the mobile electronic device at 410. The mobile electronic device may then be converted to a trusted mobile electronic device. The docking station and/or the gaming system manager may determine what secure software and/or applications are necessary for the mobile electronic device to have to become a trusted device. The secure software may then be downloaded to the mobile electronic device. Once the secured software and/or applications are downloaded and saved to the mobile electronic device, the mobile electronic device may be converted to a trusted device and a list of a plurality of games of chance may be received at the mobile gaming device at 416.

Once selected by the user, a request for a selected game of chance may be transmitted at 414 to the docking station and/or gaming system manager. The game of chance data for the selected game of chance may be received at 416. The requested game of chance data may be obtained from the gaming server and transmitted to the mobile electronic device. In another embodiment, the docking station may determine whether the requested game of chance is stored on the docking station. If the docking station determines that the requested game of chance is stored on the docking station, the docking station may transmit the requested game of chance data to the mobile electronic device.

The game of chance data may be downloaded and stored on the mobile electronic device. In another embodiment, the game of chance data may be streamed to the mobile electronic device, either from the docking station or the gaming system manager. In this embodiment, user input used to play the game of chance may be transmitted to the docking station or the gaming system manager. User input may be received from the mobile electronic device and/or the docking station.

A determination of whether the gaming session should end may be made at 418. The gaming session may end for a variety of reasons such as no more credits to play the game of chance, insufficient account balance, the player leaves the vicinity in which the mobile electronic device is trusted, the mobile electronic device is no longer capable of playing the game of chance, the mobile electronic device is in an area where playing games of chance is prohibited, the battery charge of the mobile electronic device is low, or for any legal reasons.

If it is determined that the gaming session should end at 418, any game of chance data stored on the mobile electronic device may be deleted. Any game session data as well as security software downloaded on the mobile electronic device may also be deleted. If it is determined that the gaming session should not end at 418, game of chance data may continue to be received at 416.

Figure 5:
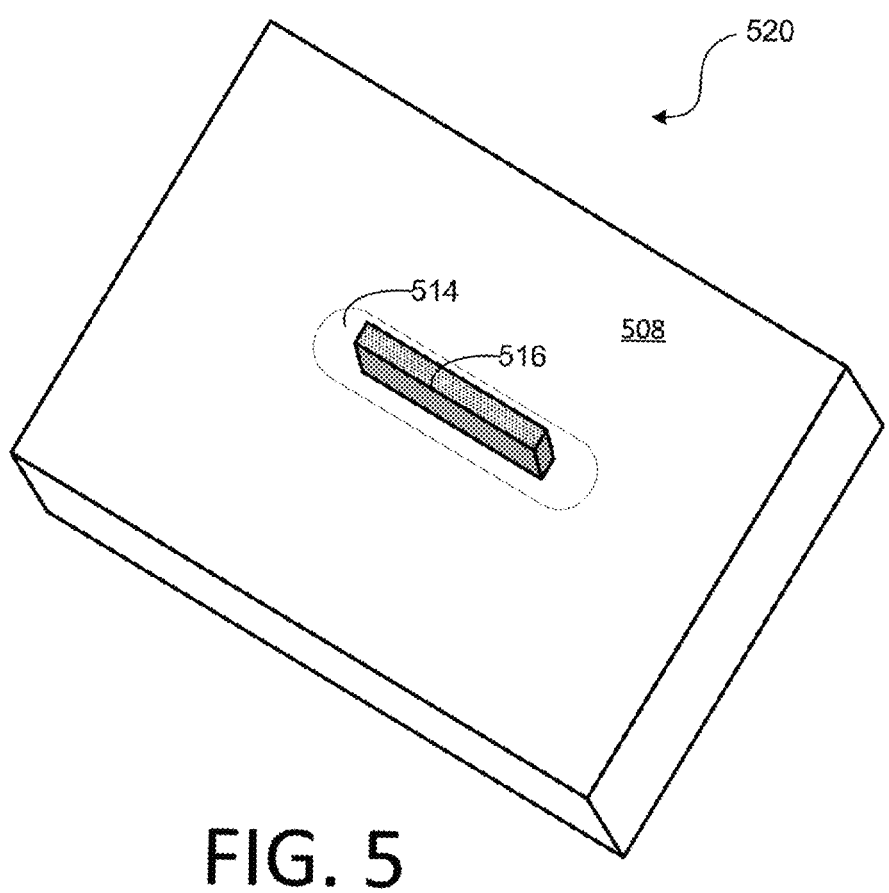
FIG. 5 illustrates an example docking station.

FIG. 5 illustrates an example docking station. The docking station 520520 may have a housing 508, a receiver 514, and a connector 516. The housing 508 may be made from any material, such as metal, plastic, and any other desired material. The housing, although illustrated as a rectangular shape, may be formed as any desired shape such as a circular, cube, square, cube, triangle, prism, and the like. The housing 508 may be formed from any known process such as being molded or any other known methods.

The receiver 514 may be designed to receive any mobile electronic device. The receiver 514 may be designed to be set into or recessed into the housing 508. In another embodiment, the receiver may extend outwardly from the housing. In still another embodiment, the receiver 514 may be flush with the housing 508 of the docking station 520.

Receiver 514 may include a connector 516 positioned in the center of the receiver 514 and extending outwardly from the receiver 514. The connector 516 may be designed to receive a mobile electronic device and configured to detect whether the mobile electronic device is physically connected to the docking station 520. The connector 516 may be designed or configured to allow the mobile electronic device to communicate with the docking station 520. As illustrated, connector 516 may have different shapes and be different types of connectors to receive different types of mobile electronic devices. Although depicted as a physical connection, the connector 516 maybe a wireless connection between the docking station and the mobile electronic device. A wireless connection is convenient to allow connection between the docking station and the mobile electronic device without having to find a matching physical connector-pair. Wireless communication technology such as WiFi (802.11x), BlueTooth, Near Field Communication, Zigbee, and the like are known in the art and can be implemented. Additionally, the charging function may also be implemented without a physical connection using a wireless charging technology. For example, wireless charging via electromagnetic induction utilizes two induction coils, one in the charging station and one in the portable electronic device, to transfer energy via alternating electromagnetic field.

In one embodiment, the detection may occur when the mobile electronic device is physically connected or coupled to the receiver 514. In another embodiment, detection may occur when an intermediary connector (not shown) may be used to connect the mobile electronic device to the receiver 514. The intermediary connector 502 may be a universal connector to allow all types of mobile electronic devices to communicate with the docking station, such as, for example, the portable intermediary trusted device discussed in U.S. application Ser. No. 13/833,116, filed Mar. 15, 2013, which is incorporated by reference. The mobile electronic device may be any device such as mobile telephones, tablet computers, laptop computers, handheld gaming devices, media players, and the like.

The intermediary connector may have a plurality of inputs configured to receive the mobile electronic device or a wire connection to the mobile electronic device. Each of the plurality of inputs may have a different configuration to receive different mobile electronic devices. The intermediary connector may also have an external wire configured to be received by a mobile electronic device. This allows connection to the docking station 520 to be a wired connection. Although depicted as a physical connection, the intermediary connector maybe replaced with a wireless connection between the docking station and the mobile electronic device. A wireless connection is convenient to allow connection between the docking station and the mobile electronic device without having to find a matching physical connector-pair. Wireless communication technology such as WiFi (802.11x), BlueTooth, Near Field Communication, Zigbee, and the like are known in the art and can be implemented.

In one embodiment, when the mobile electronic device is connected to the docking station 520, the docking station may be configured to provide an electronic charge to the mobile electronic device thereby charging the battery of the mobile electronic device. Charging maybe implemented as a wired connection. Additionally, the charging function may also be implemented without a physical connection using a wireless charging technology. For example, wireless charging via electromagnetic induction utilizes two induction coils, one in the charging station and one in the portable electronic device, to transfer energy via alternating electromagnetic field.

Once connected to or in communication with the docking station, any data may be transferred from the mobile electronic device to the docking station and vice versa using connector 516. In one example, the docking station 520 may detect whether the mobile electronic device is received by receiver 514 upon the initial transfer of information from the mobile electronic device to the docking station. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

In another example, game session data may be periodically transferred from the mobile electronic device to the docking station and game of chance data may be transmitted from the docking station to the mobile electronic device as the player plays the game of chance. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information. Game session data and/or game of chance data may be transmitted at any desired time. For example, game session data and/or game of chance data may be transmitted every thirty seconds, every minute, every fifteen minutes, every hour, or at designated time intervals such as between 1 pm-3 pm, and the like. Game session data may include any data produced during the game play such as game state data, game history data, account data, coins in and out, credits obtained or used, bonuses received, and any other game data. Game state data may show a position in a game, game progress, a current account balance, active bets placed, pending game outcomes, and the like. The game history data may include games of chance played, wagers made, past account balances, game progress, outcomes of games of chance, and the like. In one embodiment, game session data may be stored at the docking station. In another embodiment, the game session data may be received by the docking station and transmitted to the gaming system manager. In still another embodiment, the game session data may be directly received by the gaming system manager from the mobile electronic device.

Also feasible is a wireless connection for communication as well as for charging. Docking station may also have a variety of inputs, outputs, controls, peripherals, and other external devices. For example, docking station may have a plurality of user controls speaker, camera, printer, microphone, card reader, and display.

The plurality of user controls 610 may be used to transmit an input and/or output to the mobile electronic device and/or to the docking station. The plurality of user controls may be any type of user controls such as a keypad, keyboard, button panel, buttons, joystick, and any other user controls able to provide input and/or output. For example, the user controls may be used to input username, account number, request for drinks, request restaurant reservation, request a fund transfer, and any other requests and/or data. The user controls 610 may also be used to play the game of chance.

The speaker may be used to provide audio such as music, audio instructions, and any other audio sounds such as bells, whistles, and the like. For example, if the player wins a bonus play, the speaker may output a distinctive sound that alerts the player a bonus game is about to begin.

Microphone 618 may be configured to receive audio sounds from the user. For example, in lieu of using the plurality of user controls, the user may use the microphone to verbally input requests and data, such as username, account number, request for drinks, request restaurant reservation, request a fund transfer, and any other requests and/or data. In another example, microphone may be configured to recognize the voice of the player using voice recognition information previously provided by the player.

Camera may be used to detect images, such as the user's image to authenticate the user. For example, camera may be configured to conduct facial recognition to authenticate the player in order to convert the mobile electronic device to a trusted device. In another example, camera may also be used by the gaming establishment to communicate with the user and/or allow the user to play the games of chance. In another example, camera may be configured to recognize gestures. For example, if the player is playing blackjack, the player may use gestures to "Hit" or "Stand". In another example, the player may use gestures to request a fund amount. Thus, camera may be used for any gaming or non-gaming purposes.

Printer may be configured to print any information or data. For example, printer may be used to print vouchers, coupons, receipts, documents, and the like. As stated above with reference to FIG. 1, mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment by printing out a flyer notifying the player of the poker tournament. In another example, the user may show an interest in gourmet food. The gaming establishment may transmit, to the docking station, a coupon for 50% off at their steak house that may be printed using printer 616.

Card reader may be configured to read data from a storage medium, such as a credit card, player tracking card, and the like. Card reader may be used to access to a player tracking account, transfer funds from a credit card or banking card, transfer user information, or any other desired requests, uses, and the like. In another example, card reader may be used to read data from a card to authenticate and/or validate the mobile electronic device.

Display may be any type of known display such as a liquid crystal display, touch screen, and the like. Display may be used for any known purposes such as displaying or presenting gaming establishment information (e.g., list of games of chance that may be played on the mobile electronic device, tournament information, movie times, and the like) to the player, display funds in the player tracking account, display remaining credits to play the game of chance. In another example, display may be used as a touch screen to input user information, such as username, password, play games of chance, and any other information. Display may be used to present or display any other gaming or non-gaming information.

In use, a player may select to play a game of chance using a variety of methods. For example, the player may select a game of chance using the touch-screen display, one of the plurality of user inputs, both the display and at least one of the plurality of user inputs, verbally requesting the game of chance using the microphone, gesture recognition using the camera.

As discussed in detail above, the game of chance may be downloaded or streamed to the mobile electronic device. Either way, the user may play the game of chance using a variety of devices or peripherals on the docking station0. For example, the user may play the game of chance using controls on the mobile electronic device. In another example, the user may play the game of chance using the plurality of user controls, display, microphone, gesture recognition on camera, a combination of peripherals, or any other method.

After playing the game of chance, the user may want to cash out any remaining credits. The user may transmit a request to cash out using the user controls, display, microphone, camera, card reader, a combination of peripherals, or any other input methods to transmit the request to cash out. In one example, when the docking station receives the request to cash out, a credit voucher may be printed using printer. In another example, the player may verbally request to cash out using microphone and that the remaining balance be transferred to a credit card using card reader. In yet another example, user may request to cash out using display.

FIG. 6 illustrates a block diagram of an example docking station. Docking station 800 may have a processor 802, memory 828, and a plurality of peripherals. Although only a few of the peripherals will be discussed herein, it will now be known that the docking station may have and use a variety of peripherals as described herein or desired by the user. For example, processor 802 may be configured to determine whether the games of chance can be played on the mobile electronic device based on received device information. In another example, processor 802 may be configured to transmit game session data, accounting data, mobile device information, and the like to the gaming system manager and/or the mobile electronic device. In yet another example, processor may be configured to delete all gaming session data, game of chance data, and any other desired data, application, and information from the mobile electronic device. Processor 802 may be configured to communicate with the docking station 800 peripherals, mobile electronic device, gaming server, and other servers in order to carry out the necessary desired functions. For example, processor 802 may receive a game of chance request from the mobile electronic device. In turn, processor 802, may transmit the game of chance request to the gaming system manager (e.g. gaming system manager 104 illustrated in FIG. 1) via the network interface 804.

Docking station 800 may detect a mobile electronic device. In one embodiment, the docking station 800 may detect the mobile electronic device when physically connected to the receiver 808 of the docking station 800. Receiver 808 may be designed to receive any mobile electronic device and may have a connector (e.g. connector 506 illustrated in FIGS. 5A and 5B) designed to receive a mobile electronic device and configured to detect whether the mobile electronic device is physically connected to the docking station 800.

In another embodiment, the mobile electronic device may be detected when an intermediary connector (e.g. a portable intermediary trusted device) is connected to receiver 808. In still another embodiment, mobile electronic device may communicate wireless with docking station 800 via wireless interface 801 using any known wireless technology such as such as a 3G wireless technology, 4G wireless technology, Bluetooth, Wireless USB, Near-field magnetic, Fire Wire, WiMax, IEEE 802.11x technology, radio frequency, and the like.

Once detected, mobile device information may be obtained from the mobile electronic device. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

Mobile device information may be stored in memory 828. Memory 828 may be configured to store any type of data such as, game of chance data, secure software, applications, game session data, and any other desired data or information. Memory 828 may be any type of memory including random access memory (RAM), read only memory (ROM), non-volatile random access memory (NVRAM), disk memory, magnetic tapes, paper tapes, laser storage and the like. Independently, random access memory requires power in order to maintain stored data. Battery backed RAM may store variable if the power goes down. ROM cannot be adjusted once written but does not require power in order to store information. NVRAM does not require power in order to maintain variables and can be written to. Disk memory and tape memory may be a bit slower but can store variables without power. ROM may be useful for storing games of chance on the docking station. RAM and NVRAM may also be useful for storing games on the docking station, especially if the docking station only temporarily stores games during a particular gaming session.

Docking station 800 may have a variety of peripherals such as user controls 801, card reader 814, microphone 822, camera 824, and display 826. User controls 801 may be used to transmit an input and/or output to the mobile electronic device and/or to the docking station. User controls 801 may be any type of user controls such as a keypad, keyboard, button panel, buttons, joystick, and any other user controls able to provide input and/or output. For example, user controls 801 may be used to input username, account number, request for drinks, request restaurant reservation, request a fund transfer, and any other requests and/or data. The user controls 801 may also be used to play the game of chance.

Microphone 822 may be configured to receive audio sounds from the user. For example, in lieu of using user controls 801, the user may use the microphone 822 to verbally input requests and data, such as username, account number, request for drinks, request restaurant reservation, request a fund transfer, and any other requests and/or data. In another example, microphone 822 may be configured to recognize the voice of the player using voice recognition information previously provided by the player.

Camera 824 may be used to detect images, such as the user's image to authenticate the user. For example, camera 824 may be configured to conduct facial recognition to authenticate the player in order to convert the mobile electronic device to a trusted device. In another example, camera 824 may also be used by the gaming establishment to communicate with the user and/or allow the user to play the games of chance. In another example, camera 824 may be configured to recognize gestures. For example, if the player is playing blackjack, the player may use gestures to "Hit" or "Stand". In another example, the player may use gestures to request a fund amount. Thus, camera 824 may be used for any gaming or non-gaming purposes.

Printer 816 may be configured to print any information or data. For example, printer 816 may be used to print vouchers, coupons, receipts, documents, and the like. As stated above with reference to FIG. 1, mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment by printing out a flyer notifying the player of the poker tournament. In another example, the user may show an interest in gourmet food. The gaming establishment may transmit, to the docking station, a coupon for 50% off at their steak house that may be printed using printer 816.

Card reader 814 may be configured to read data from a storage medium, such as a credit card, player tracking card, and the like. Card reader 814 may be used to access to a player tracking account, transfer funds from a credit card or banking card, transfer user information, or any other desired requests, uses, and the like. In another example, card reader 814 may be used to read data from a card to authenticate and/or validate the mobile electronic device.

Display 826 may be any type of known display such as a liquid crystal display, touch screen, and the like. Display 826 may be used for any known purposes such as displaying or presenting gaming establishment information (e.g., list of games of chance that may be played on the mobile electronic device, tournament information, movie times, and the like) to the player, display funds in the player tracking account, display remaining credits to play the game of chance. In another example, display 826 may be used as a touch screen to input user information, such as username, password, play games of chance, and any other information. Display 826 may be used to present or display any other gaming or non-gaming information.

Docking station 800 may also have a notification device 812. Notification device 812 may be a light, light rope, light pipe, candle (e.g. candle 1210 illustrated in FIGS. 10A and 10B), multicolor LED's, a speaker which makes noise, and any other notification device to notify service personnel that a service request is desired by the player. In another example, notification device 812 may notify service personnel of the gaming establishment that the docking station has a failure or malfunction. In another example, if a player would like to ordered a drink, a yellow light can flash to notify a waitress. In another example, a red light can flash to indicate a malfunction.

Docking station 800 may also have a scanner 818. Scanner may be used to scan documents, bar codes, and the like. For example, the scanner may be used by the player to scan a voucher printed from another gaming machine. The credits remaining on the voucher may then be used to play the games of chance. In another example, the player may scan a voucher to participate in a poker tournament without having to be at the exact location of where the poker tournament is being played.

Docking station 800 may also have a motion tracking device 820. The motion tracking device 820 may be used to play the games of chance. The motion tracking device 820 may be any device configured to determine the orientation, produce motion, and the like on the docking station 800 and/or the mobile electronic device. For example, the motion tracking device 820 may be a gyroscope to determine orientation, a laser, haptic transducers, and/or an accelerometer to determine acceleration magnitude and vectors. For example, if playing a car racing simulation game of chance, the docking station 800 may be tilted to the right in order to turn the car to the right. When the docking station 800 is turned to the right, the motion tracking device 820 may determine the orientation and turn the car in the simulation game of chance to the right. If the car crashes, haptic transducers in the docking station 800 may cause the docking station to vibrate in response to the crash.

Figure 7A:
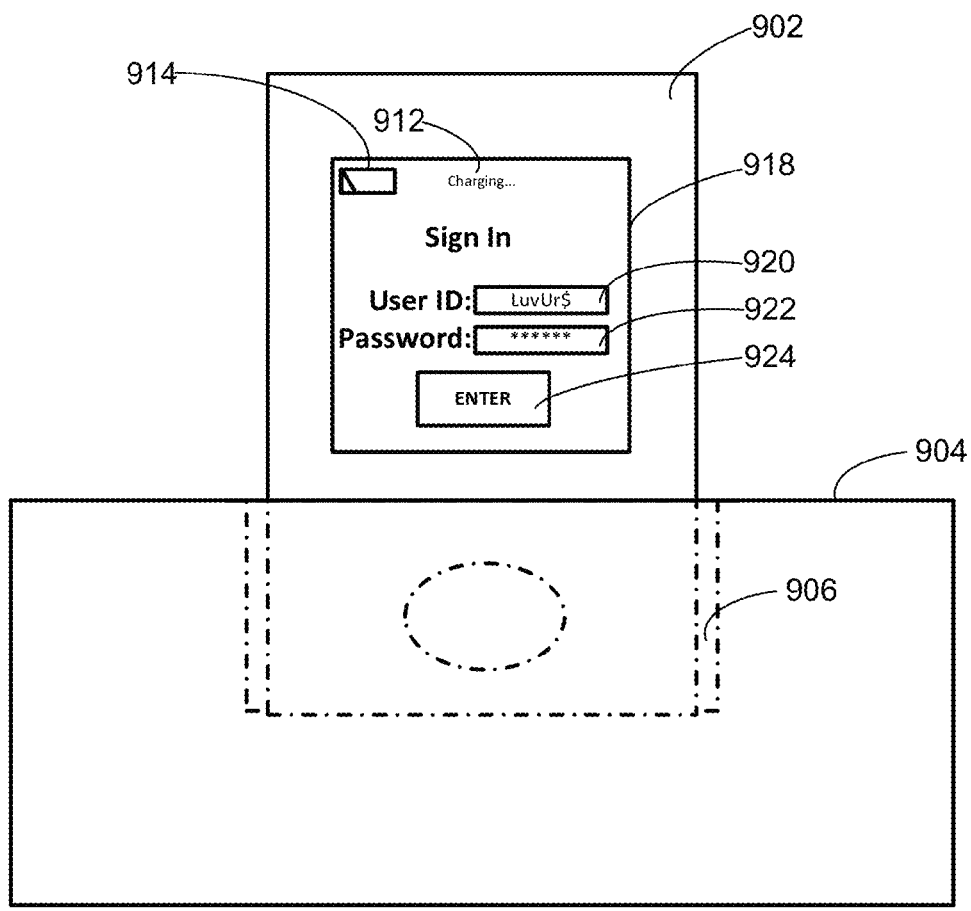
FIGS. 7A-7B illustrate an example authorization of a mobile electronic device to play a game of chance.
Figure 7B:
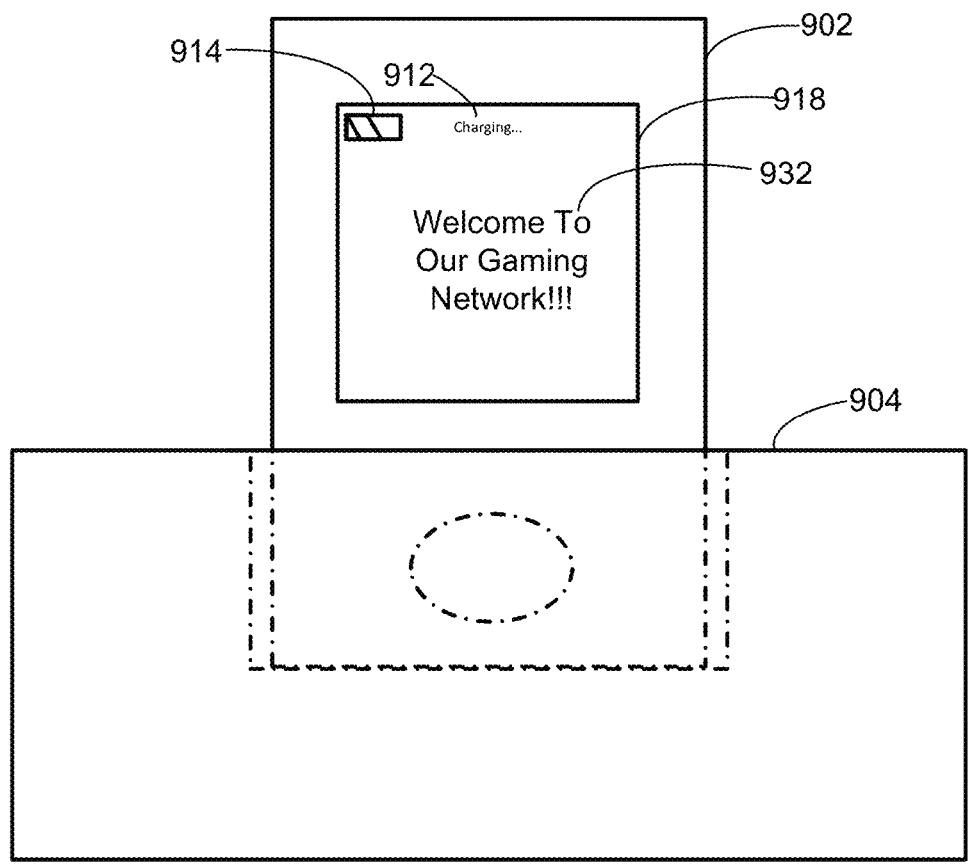

FIGS. 7A-7B illustrate an example authorization of a mobile electronic device to play a game of chance. The mobile electronic device 902 may be inserted into the receiver 906 of the docking station 904. The receiver 906 may have a connector (e.g. connector 516 illustrated in FIG. 5) configured to connect the mobile electronic device to the docking station. The connector may be designed to receive the mobile electronic device and configured to detect whether the mobile electronic device is physically connected to the docking station. The connector may be designed or configured to allow the mobile electronic device to communicate with the docking station. As previously discussed in FIG. 5, the connection maybe implemented as a wired or a wireless connection.

Referring to FIG. 7A, once the mobile electronic device 902 is physically connected to the docking station 904, the docking station 904 may detect the mobile electronic device. The mobile electronic device may have a display 918 displaying a battery life indicator 914. As illustrated, the battery life indicator 914 may indicate that the mobile electronic device 902 is not fully charged. If not fully charged, the docking station 904 may transmit a charge to the battery of the mobile electronic device 902 to recharge the battery of the mobile electronic device. In one embodiment, the mobile electronic device may indicate that it is being charged with a message displayed on display 918. For example, "Charging" 912 may be displayed on display 918.

Docking station may transmit an authentication request to the mobile electronic device to authenticate the mobile electronic device 902 and/or the user. In one embodiment, a request for a user identification 920 and password 922 may be displayed on display 918. The player may then enter the button 924 on the display 902 to gain authorization.

Referring now to FIG. 7B, after a period of time being physically connected to the gaming, the battery life indicator 914 indicates that the battery is being recharged. If the mobile electronic device is authenticated an authentication notification may be transmitted to the mobile gaming device 902 and presented on display 912. For example, FIG. 8B may display a "Welcome To Our Gaming Network!!!" 932 message on display 918. This indicates that the mobile gaming device 902 and/or user is authenticated.

Figure 8A:
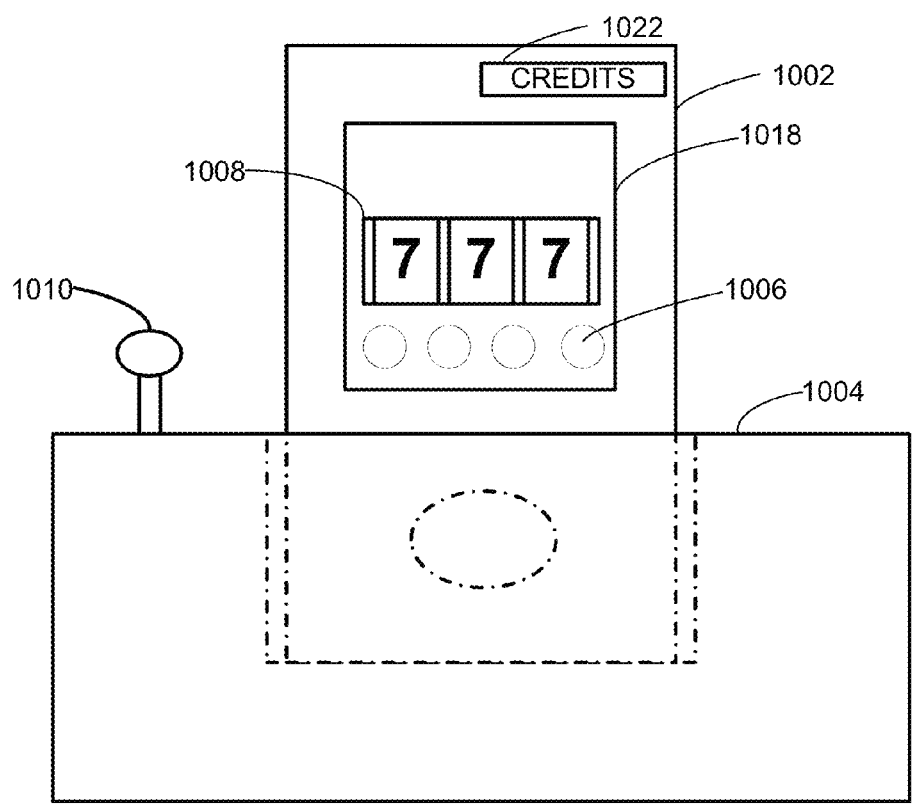
FIGS. 8A-8B illustrate an example use of a docking station.
Figure 8B:
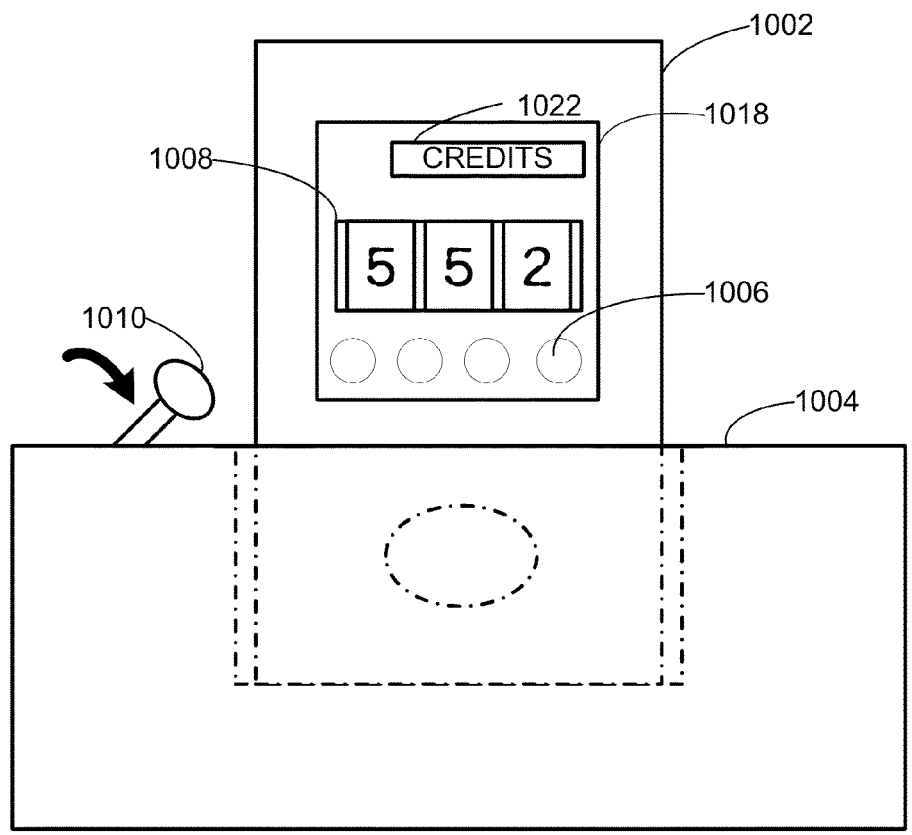

FIGS. 8A-8B illustrate an example use of a docking station. FIG. 8A illustrates the mobile electronic device 1002 docked in the docking station 1004 while playing a game of chance presented on display 1018. The display 1018 may present a plurality of user interface controls 1006. The user interface controls 1006 may be any type of displayed user controls used to play the game of chance such as to select a wager amount, spin, cash out, and the like. The amount of credits remaining 1022 may also be presented on display 1018.

In one embodiment, docking station 1004 may have a joystick 1010. The joystick may also be used to play the game of chance 1009. As illustrated, joystick 1010 may be used to spin the reels 1008 of the game of chance presented on display 1018. The joystick may be in a first position indicating that no action has been taken. Referring to FIG. 8B, the player may move the joystick 1010 to a second position indicating that the player would like to spin the reel 1008 using the joystick 1010 and not the user interface controls 1006.

Figure 9A:
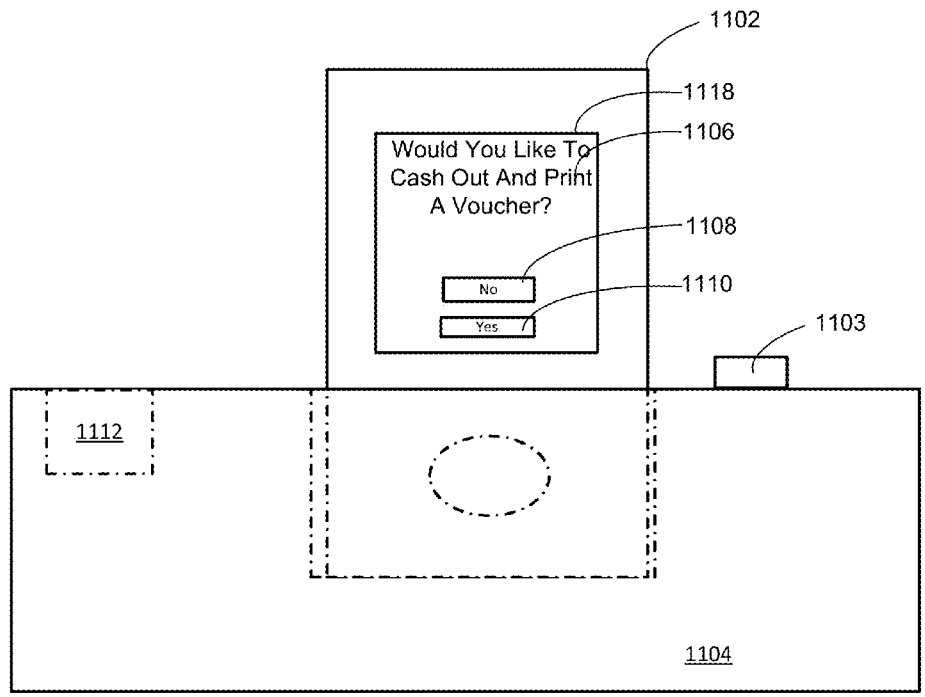
FIGS. 9A-9B illustrate another example use of a document station.
Figure 9B:
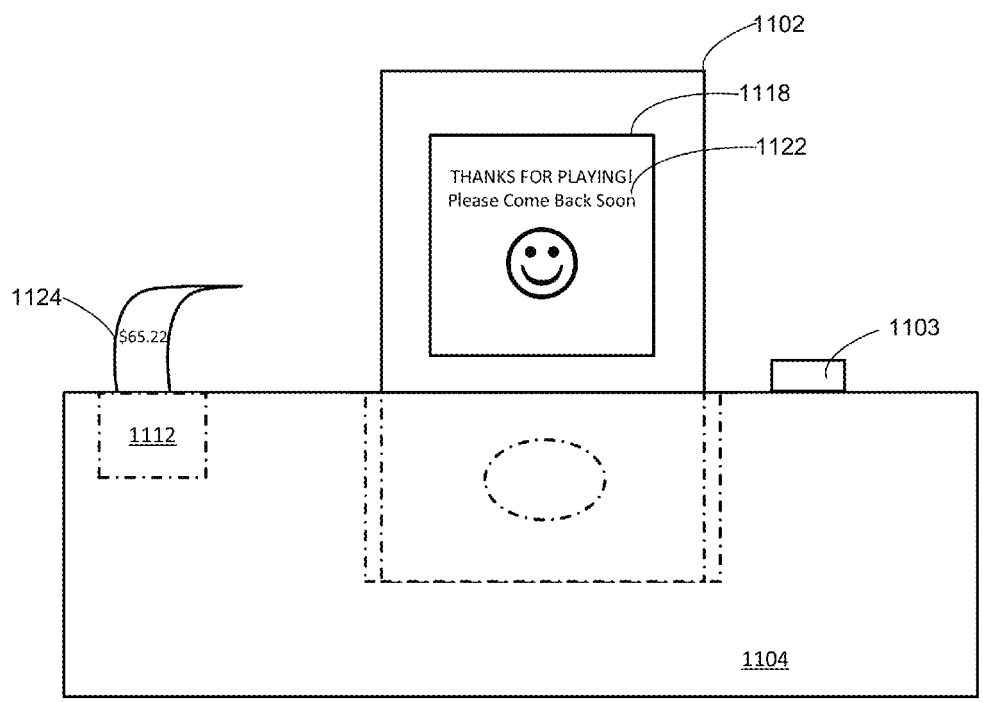

FIGS. 9A-9B illustrate another example use of a document station. If the user would like to end the game session, the user may want to cash out his remaining credits. FIG. 9A illustrates the mobile electronic device 1102 connected to docking station 1104. In one embodiment, the player may use user interface controls (e.g. user interface controls 1006 illustrated in FIGS. 8A and 8B) to cash out. In another embodiment, the player may use user controls 1103 (e.g., user controls 610 illustrated in FIG. 6) to cash out.

Once a request to cash out is transmitted to the docking station 1104, the player may be questioned to determine whether the player would like to print a voucher for the remaining credit. For example, a message "Would You Like To Cash Out And Print A Voucher?" 1106 may be displayed on display 1118. A "No" indicator 1108 and a "Yes" indicator 1110 may be simultaneously displayed on display 1118. Although the inquiry is illustrated as being presented on the display 1118 of the mobile electronic device 1102, this is not intended to be limiting as the inquiry may also be presented on a display of the docking station 1104 (e.g. display 622 illustrated in FIG. 6).

Referring now to FIG. 9B, if the player would like a voucher printed out for the remaining credit balance, printer 1112 may print the voucher 1124. Once the voucher is printed, display 1118 may present a completion notification 1122 such as, for example, "THANKS FOR PLAYING! Please Come Back Soon".

Figure 10A:
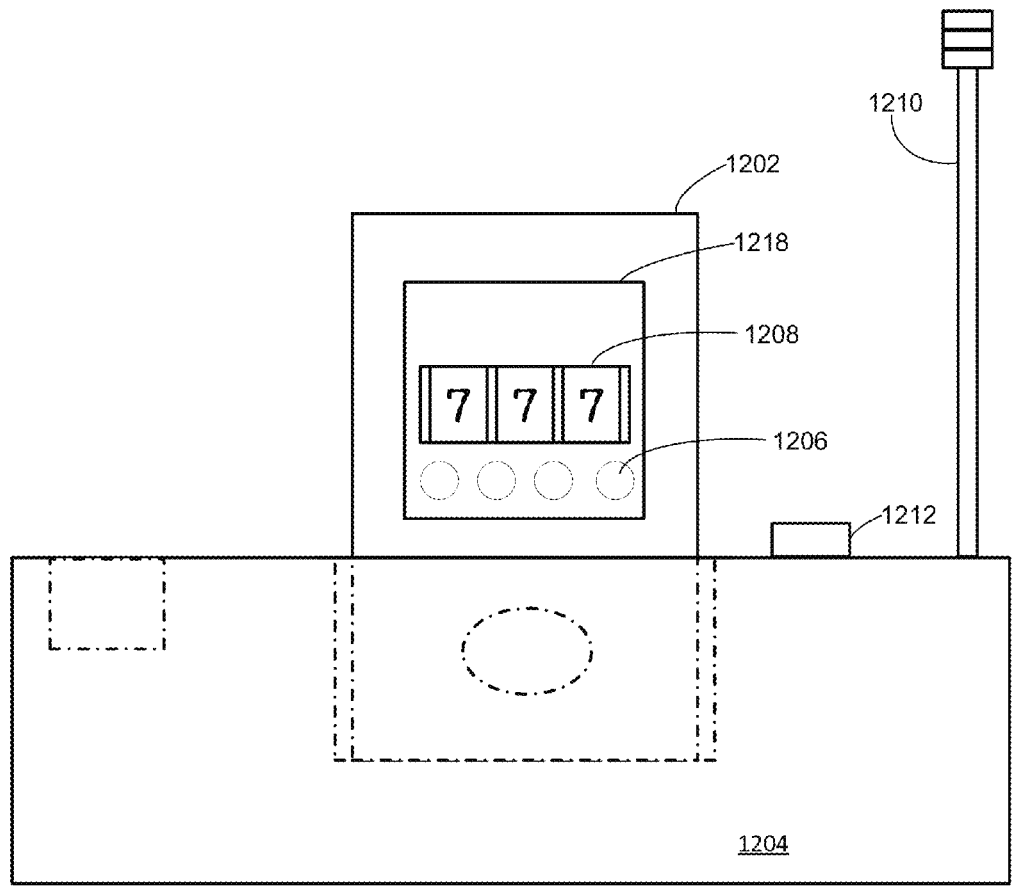
FIGS. 10A-10B illustrate still another example use of a docking station.
Figure 10B:
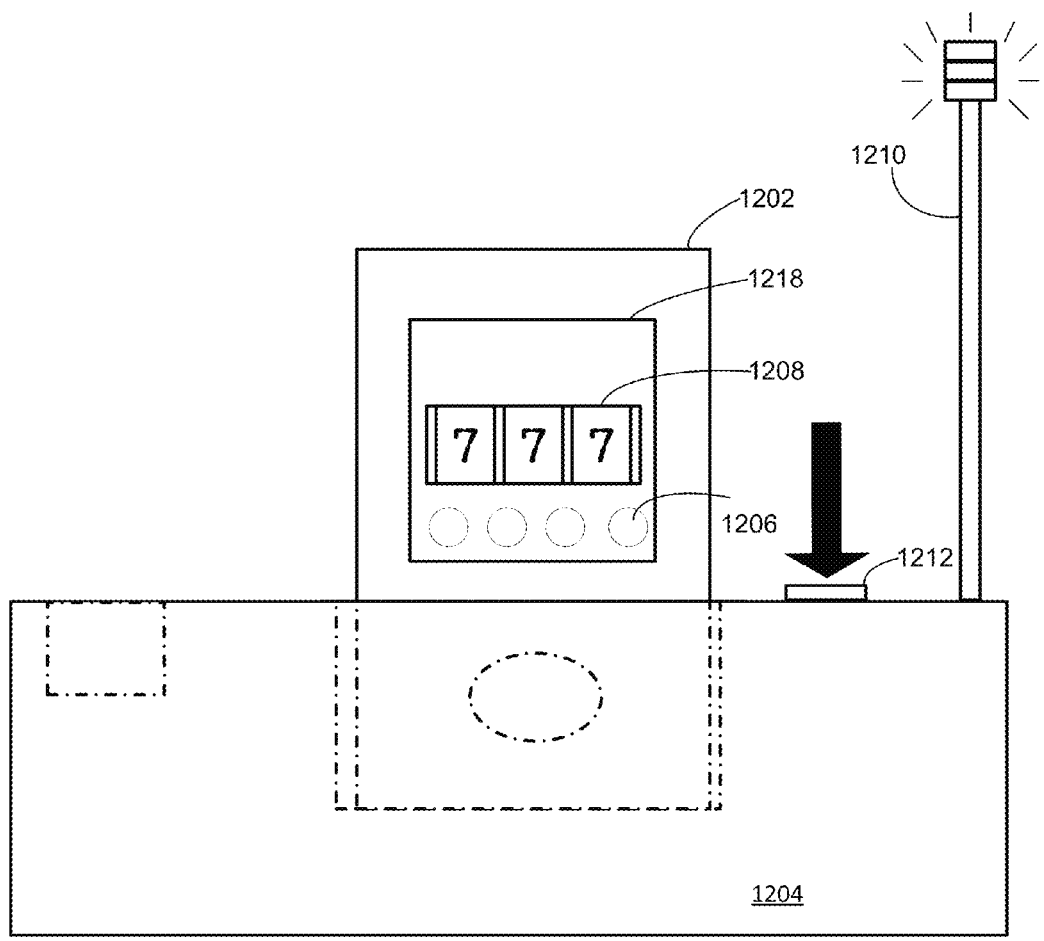

FIGS. 10A-10B illustrate still another example use of a docking station. Referring to FIGS. 10A and 10B, while the player is playing the game of chance 1208, waiting for the mobile electronic device 1202 to charge, or for any other reason, player may want to order a drink, food, or any other type of service. Thus, the docking station 1204 may be used to make service calls. The user may use either the user interface controls 1206 displayed on display 1218 or the user controls 1212 on the docking station 1204 to indicate he would like to make a service request. The request for service may be transmitted to the docking station 1204 and a candle 1210 on the docking station may be illuminated (as illustrated in FIG. 10B) to alert the customer service personnel that the player would like to make a service request.

Figure 11A:
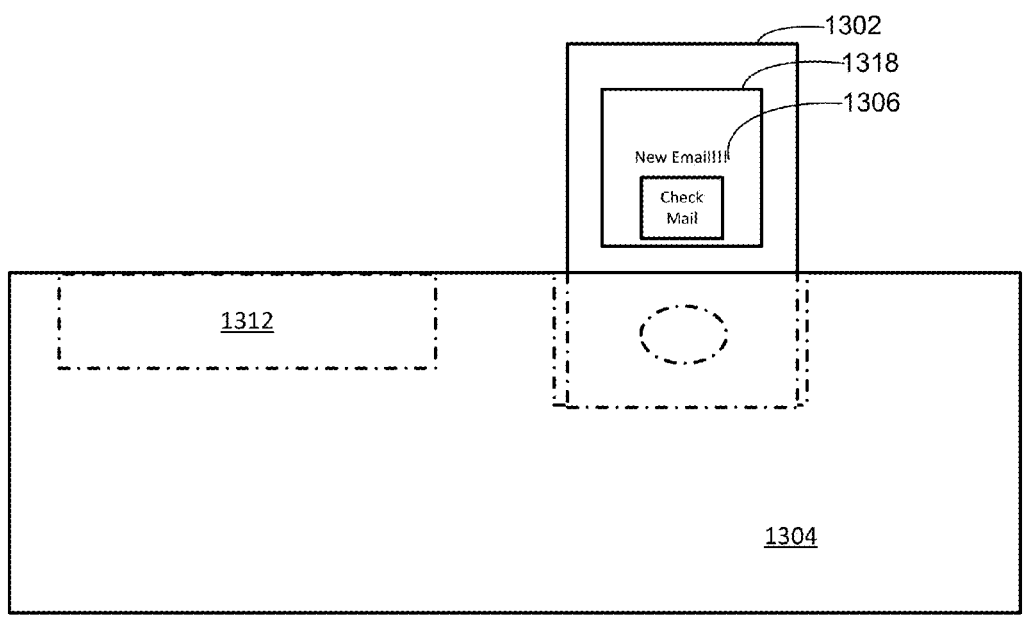
FIGS. 11A-11D Illustrate yet another example use of the docking station.

FIGS. 11A-11D Illustrate yet another example use of the docking station. Some players may desire to work while playing games of chance for entertainment, such as while on vacation. The docking station may provide the flexibility for business people to work while on vacation (or not on vacation) and may also be used as a work station. As illustrated in FIG. 11A, if the mobile electronic device 1302 is able to receive electronic mail (e-mail), display 1318 may indicate that the player has a new email message 1306.

Figure 11B:
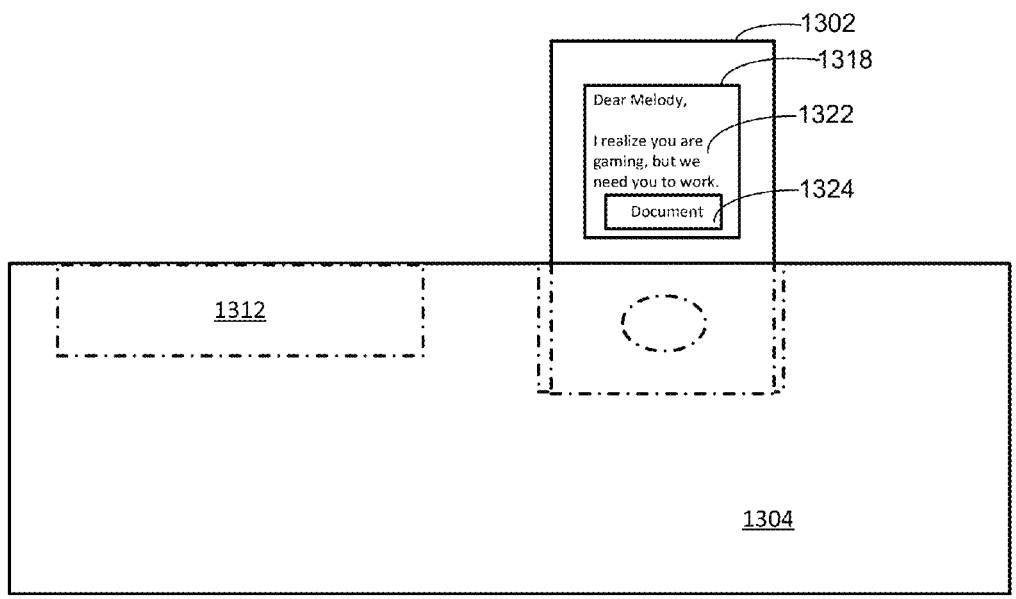
Figure 11C:
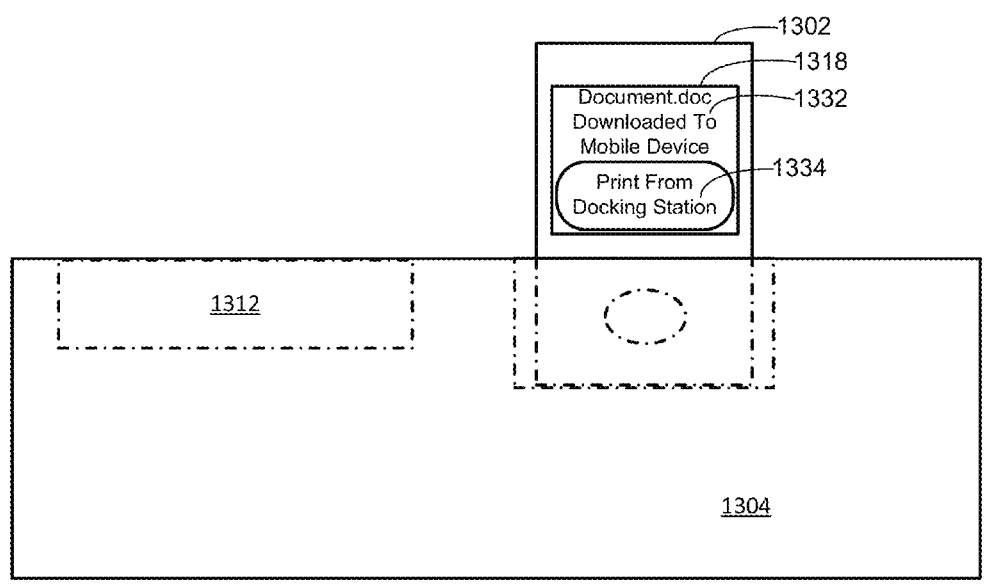
Figure 11D:
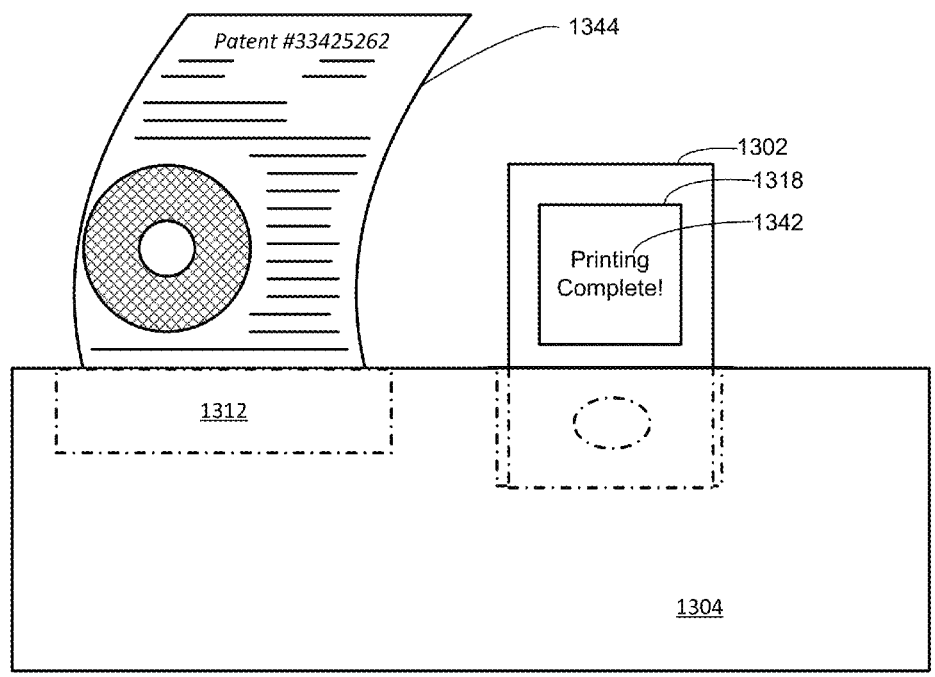

Referring now to FIG. 11B, the e-mail message may be displayed 1322 on display 1318. The email message may contain a document 1324 that the player may need to print out to review. As illustrated in FIG. 11C, the user may be provided the option 1334 to print the document using the docking station 1304. In one embodiment, the user may be charged per page for each page printed out and may use the docking station to pay for the printouts. In another embodiment, the user is not charged for the printout. If the user would like to print the document using the docking station, as illustrated in FIG. 11D, the document 1344 may be printed using printer 1312. Upon completion of the printing, display 1318 may display a completion notification 1342, for example, a "Printing Complete!" message.

While embodiments and applications of this invention have been shown and described, it would be apparent to those skilled in the art having the benefit of this disclosure that many more modifications than mentioned above are possible without departing from the inventive concepts herein.

What is claimed is:

1. A system to authorize a mobile electronic device to play games of chance, comprising:
   a gaming system manager; and
   a portable docking station configured to communicate with the gaming system manager and the mobile electronic device, the portable docking station further configured to:
   detect whether the mobile electronic device is connected to a receiver of the portable docking station;
   receive device information from the mobile electronic device if it is detected that the mobile electronic device is connected to the receiver;
   determine whether the games of chance can be played on the mobile electronic device based on the received device information;
   authorize the mobile electronic device to play the games of chance; and
   transmit gaming data to the mobile electronic device if it is determined that the games of chance can be played on the mobile electronic device and if the mobile electronic device is authorized,
   wherein once the mobile electronic device is authorized to play the games of chance, the mobile electronic device is deemed a trusted gaming device for use within a gaming system manager of a gaming establishment.

2. The system of claim 1, wherein the gaming system manager further comprises at least one gaming server configured to store at least one of game of chance data, player information and data, or mobile electronic device data.

3. The system of claim 1, wherein the gaming system manager further comprises a gaming database to store at least one of game state data, game history data, or game session data received from the portable docking station.

4. The system of claim 1, wherein the portable docking station is further configured to:
   receive user information from the mobile electronic device;
   receive player information from the gaming system manager; and
   compare the user information to the player information to authorize the mobile electronic device to play the games of chance.

5. The system of claim 1, further comprising:
   a second portable docking station configured to:
   detect whether the mobile electronic device is connected to a receiver of the second portable docking station;
   receive device information from the mobile electronic device if it is detected that the mobile electronic device is connected to the receiver of the second portable docking station; and
   transmit the device information to the gaming system manager,
   wherein the gaming system manager is configured to determine whether the mobile electronic device was previously connected to another portable docking station based on the received device information.

6. A docking station configured to authorize a mobile electronic device to play games of chance, comprising:
   a receiver configured to receive the mobile electronic device; and
   a processor configured to:
   detect whether the mobile electronic device has been received by the receiver;
   receive device information from the mobile electronic device if it is detected that the mobile electronic device is received by the receiver;
   determine whether the games of chance can be played on the mobile electronic device based on the received device information;
   authorize the mobile electronic device to play the games of chance; and
   transmit gaming data to the mobile electronic device if it is determined that the games of chance can be played on the mobile electronic device and if the mobile electronic device is authorized,
   wherein once the mobile electronic device is authorized to play the games of chance, the mobile electronic device is deemed a trusted gaming device for use within a gaming system manager of a gaming establishment.

7. The docking station of claim 6, further comprising a plurality of user gaming controls, at least one of the plurality of user controls configured to allow a user to play the games of chance presented on a display of the mobile electronic device while the mobile electronic device is connected to the receiver.

8. The docking station of claim 6, further comprising a display configured to present text, images, or graphics.

9. The docking station of claim 6, further comprises a plurality of peripheral devices, wherein the plurality of peripheral devices includes at least one of a printer, accelerometer, card reader, illuminating devices, speaker, gyroscope, haptic transducer, optical scanner, button panel, touch pad, microphone, and camera.

10. The docking station of claim 6, wherein the processor is configured to periodically transmit at least one of game state data, game history data, and game session data to the gaming system manager.

11. A method for authorizing a mobile electronic device to play games of chance using a docking station, the method comprising:
   detecting that the mobile electronic device is coupled to the docking station;
   receiving device information from the mobile electronic device after it is detected that the mobile electronic device has been coupled to the docking station;
   determining whether the games of chance are permitted to be played on the mobile electronic device based on the received device information;
   authorizing the mobile electronic device for playing the games of chance when it is determined that the games of chance are permitted to be played; and
   transmitting gaming data to the mobile electronic device if it is determined that the games of chance are permitted to be played on the mobile electronic device and if the mobile electronic device is authorized,
   wherein at least the determining and authorizing are performed by the docking station.

12. The method of claim 11, wherein the device information includes device capabilities of the mobile electronic device and wherein the device capabilities includes at least one of power capacity, display resolution, memory capacity, processor capacity, and type of mobile electronic device.

13. The method of claim 11, wherein the receiving device information further comprises:
   determining whether the mobile electronic device was previously authorized for playing the games of chance by another docking station based on the received device information.

14. The method of claim 11, wherein the authorizing further includes:
   receiving user information from the mobile electronic device;
   receiving player information from a gaming server; and
   comparing the user information to the player information.

15. The method of claim 11, wherein the transmitting gaming data further includes:
   receiving a transfer fund request from the mobile electronic device, the transfer fund request including a fund amount;
   determining whether to fund a player account with the fund amount; and
   funding a player account with the fund amount if it is determined to fund the player account, the fund amount used to play the games of chance.

16. A method for converting a mobile electronic device to a trusted mobile electronic device using a portable docking station, the method comprising:
   detecting that the mobile electronic device is coupled to the portable docking station;
   receiving device information from the mobile electronic device after it is detected that the mobile electronic device has been coupled to the portable docking station;
   determining whether games of chance are permitted to be played on the mobile electronic device based on the received device information;
   authorizing a user to play the games of chance on the mobile electronic device if the determining determines that games of chance are permitted to be played on the mobile electronic device;
   converting the mobile electronic device to the trusted mobile electronic device if the user is authorized to play the games of chance on the mobile electronic device; and
   transmitting gaming data to the trusted mobile electronic device if the mobile electronic device is converted to a trusted mobile electronic device,
   wherein at least the determining and authorizing are performed by the portable docking station.

17. The method of claim 16, further comprising:
   receiving at least one of game state data, game history data, and game session data from the trusted mobile electronic device; and
   periodically transmitting the received at least one of game state data, game history data, and game session data to a gaming server.

18. The method of claim 16, wherein the device information includes device capabilities of the mobile electronic device and wherein the device capabilities includes at least one of power capacity, display resolution, memory capacity, processor capacity, and type of mobile electronic device.

19. The method of claim 16, further comprising:
   determining if the gaming session had ended; and
   ending the gaming session if it is determined that the gaming session has ended.

20. The method of claim 19, wherein the determining further comprises:
   detecting whether the mobile electronic device is no longer in a detection range of the portable docking station.

* * * * *